(12) United States Patent
Kent et al.

(10) Patent No.: US 8,422,606 B2
(45) Date of Patent: *Apr. 16, 2013

(54) METHOD AND SYSTEM FOR PRE-EQUALIZATION IN A SINGLE WEIGHT SPATIAL MULTIPLEXING MIMO SYSTEM

(75) Inventors: Mark Kent, Vista, CA (US); Vinko Erceg, Cardiff, CA (US); Uri M Landau, San Diego, CA (US); Pieter van Rooyen, San Diego, CA (US); Pieter Roux, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,011

(22) Filed: Dec. 15, 2011

(65) Prior Publication Data
US 2012/0087434 A1  Apr. 12, 2012

Related U.S. Application Data

(63) Continuation of application No. 11/173,727, filed on Jun. 30, 2005, now Pat. No. 8,098,776.

(60) Provisional application No. 60/616,291, filed on Oct. 6, 2004.

(51) Int. Cl.
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl.
USPC ............ 375/346; 375/141; 375/232; 375/296

(58) Field of Classification Search .................. 375/130, 375/140, 141, 146–147, 229–232, 259–260, 375/267, 295, 296, 316, 346, 347, 354, 358
See application file for complete search history.

(56) References Cited

U.S. PATENT DOCUMENTS

| 3,638,125 A | 1/1972 | Goell |
| 4,144,411 A * | 3/1979 | Frenkiel ........................ 455/447 |

(Continued)

OTHER PUBLICATIONS

Haykin, S., et al., "Turbo-MIMO for Wireless Communications," *IEEE Communications Magazine*—42(10): 48-53, IEEE, United States (Oct. 2004).

(Continued)

*Primary Examiner* — David C. Payne
*Assistant Examiner* — James M Perez
(74) *Attorney, Agent, or Firm* — Sterne, Kessler, Goldstein & Fox P.L.L.C.

(57) ABSTRACT

Certain aspects of the method may comprise receiving a plurality of spatially multiplexed communication signals from a plurality of transmit antennas at a base station. A plurality of vectors of baseband combined channel estimates may be generated based on phase rotation of the received plurality of spatially multiplexed communication signals. A plurality of pre-equalization weights may be generated based on the generated plurality of vectors of baseband combined channel estimates. The received plurality of spatially multiplexed communication signals may be modified based on the generated plurality of pre-equalization weights. At least a portion of the generated plurality of pre-equalization weights may be fed back to the base station for modifying subsequently transmitted spatially multiplexed communication signals which are transmitted from at least a portion of the plurality of transmit antennas at the base station.

20 Claims, 11 Drawing Sheets

U.S. PATENT DOCUMENTS

| | | | |
|---|---|---|---|
| 5,852,630 A | | 12/1998 | Langberg et al. |
| 6,097,773 A * | | 8/2000 | Carter et al. ............... 375/347 |
| 6,115,409 A | | 9/2000 | Upadhyay et al. |
| 6,128,276 A | | 10/2000 | Agee |
| 7,020,175 B2 | | 3/2006 | Frank |
| 7,167,507 B2 | | 1/2007 | Mailaender et al. |
| 7,286,593 B1 | | 10/2007 | Banerjee |
| 7,346,121 B2 | | 3/2008 | Dabak et al. |
| 7,477,695 B2 | | 1/2009 | Takano |
| 7,570,696 B2 | | 8/2009 | Maltsev et al. |
| 7,593,493 B2 | | 9/2009 | Kent et al. |
| 7,715,798 B2 | | 5/2010 | Onggosanusi et al. |
| 7,995,537 B2 | | 8/2011 | Kent et al. |
| 8,098,776 B2 * | | 1/2012 | Kent et al. ............ 375/346 |
| 8,111,789 B2 | | 2/2012 | Kent et al. |
| 2001/0020919 A1 | | 9/2001 | Maruta |
| 2002/0111780 A1* | | 8/2002 | Sy .............................. 703/2 |
| 2003/0016768 A1 | | 1/2003 | Huang et al. |
| 2003/0031234 A1 | | 2/2003 | Smee et al. |
| 2003/0094976 A1 | | 5/2003 | Miyashita |
| 2003/0199264 A1 | | 10/2003 | Holenstein et al. |
| 2003/0235146 A1* | | 12/2003 | Wu et al. .................. 370/203 |
| 2003/0235292 A1 | | 12/2003 | Cheng |
| 2004/0192218 A1 | | 9/2004 | Oprea |
| 2004/0264600 A1 | | 12/2004 | Kao et al. |
| 2005/0020310 A1 | | 1/2005 | Nakaya et al. |
| 2005/0025093 A1 | | 2/2005 | Yun et al. |
| 2005/0088215 A1 | | 4/2005 | Suissa et al. |
| 2005/0128985 A1 | | 6/2005 | Liberti, Jr. et al. |
| 2005/0184906 A1* | | 8/2005 | Nakaya et al. ............ 342/377 |
| 2005/0207476 A1 | | 9/2005 | Anderson |
| 2005/0243898 A1 | | 11/2005 | Reznik et al. |
| 2005/0260962 A1 | | 11/2005 | Nazrul et al. |
| 2006/0153059 A1 | | 7/2006 | Spence et al. |
| 2007/0015545 A1 | | 1/2007 | Leifer et al. |
| 2008/0170533 A1* | | 7/2008 | Cyzs et al. ................ 370/315 |

OTHER PUBLICATIONS

Love, D.J., et al. "What Is the Value of Limited Feedback for MIMO Channels?" *IEEE Communications Magazine*—42(10): 54-59, IEEE, United States (Oct. 2004).

Mietzner, J. and Hoeher, P.A., "Boosting the Performance of Wireless Communication Systems: Theory and Practice of Multiple-Antenna Techniques," *IEEE Communications Magazine*—42(10): 40-47, IEEE, United States (Oct. 2004).

Nosratinia, A., "Cooperative Communication in Wireless Networks," *IEEE Communications Magazine*—42(10): 74-80, IEEE, United States (Oct. 2004).

Sanayei, S. and Nosratinia, A., "Antenna Selection in MIMO Systems," *IEEE Communications Magazine*—42(10): 68-73, IEEE, United States (Oct. 2004).

Spencer, Q.H., et al., "An Introduction to the Multi-User MIMO Downlink," *IEEE Communications Magazine*—42(10): 60-67, IEEE, United States (Oct. 2004).

Winters, J.H., "Optimum Combining for Indoor Radio Systems with Multiple Users," *IEEE Transactions on Communications*—COM-35(11): 1222-1230, IEEE, United States (Nov. 1987).

Non-Final Rejection mailed Mar. 27, 2012 for U.S. Appl. No. 13/327,027, filed Dec. 15, 2011; 29 pages.

3GPP TS 25.214 V6.2.0 (Jun. 2004) Technical Specification; 3rd Generation Partnership Project: Technical Specification Group Radio Access Network: Physical Layer Procedures (FDD) (Release 6), pp. 1-64; Copyright 2004, France.

\* cited by examiner

METHOD AND SYSTEM FOR PRE-EQUALIZATION IN A SINGLE WEIGHT SPATIAL MULTIPLEXING MIMO SYSTEM

CROSS-REFERENCE TO RELATED APPLICATIONS/INCORPORATION BY REFERENCE

This patent application is a continuation of U.S. Ser. No. 11/173,727 filed Jun. 30, 2005, which application makes reference to, claims priority to and claims benefit from U.S. Provisional Patent Application Ser. No. 60/616,291 filed Oct. 6, 2004.

This application also makes reference to:
U.S. application Ser. No. 11/173,870 filed Jun. 30, 2005;
U.S. application Ser. No. 11/174,303 filed Jun. 30, 2005;
U.S. application Ser. No. 11/173,502 filed Jun. 30, 2005;
U.S. application Ser. No. 11/173,871 filed Jun. 30, 2005;
U.S. application Ser. No. 11/173,964 filed Jun. 30, 2005;
U.S. application Ser. No. 11/173,252 filed Jun. 30, 2005;
U.S. application Ser. No. 11/174,252 filed Jun. 30, 2005;
U.S. application Ser. No. 11/172,756 filed Jun. 30, 2005;
U.S. application Ser. No. 11/173,305 filed Jun. 30, 2005;
U.S. application Ser. No. 11/172,759 filed Jun. 30, 2005;
U.S. application Ser. No. 11/173,689 filed Jun. 30, 2005;
U.S. application Ser. No. 11/173,304 filed Jun. 30, 2005;
U.S. application Ser. No. 11/173,129 filed Jun. 30, 2005;
U.S. application Ser. No. 11/172,779 filed Jun. 30, 2005;
U.S. application Ser. No. 11/172,702 filed Jun. 30, 2005;
U.S. application Ser. No. 11/173,726 filed Jun. 30, 2005;
U.S. application Ser. No. 11/172,781 filed Jun. 30, 2005;
U.S. application Ser. No. 11/174,067 filed Jun. 30, 2005;
U.S. application Ser. No. 11/173,854 filed Jun. 30, 2005;
U.S. application Ser. No. 11/173,911 filed Jun. 30, 2005; and
U.S. application Ser. No. 11/174,403 filed Jun. 30, 2005.

The above referenced applications are hereby incorporated herein by reference in their entirety.

FIELD OF THE INVENTION

Certain embodiments of the invention relate to pre-equalization. More specifically, certain embodiments of the invention relate to a method and system for pre-equalization in a single weight spatial multiplexing multi-input multi-output (MIMO) system.

BACKGROUND OF THE INVENTION

In most current wireless communication systems, nodes in a network may be configured to operate based on a single transmit and a single receive antenna. However, for many of current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, CDMA-based systems, TDMA-based systems, WLAN systems, and OFDM-based systems such as IEEE 802.11a/g/n, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers. Accordingly, N signals may be simultaneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems. One attractive aspect of multi-antenna systems, in particular MIMO systems, the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor in the increased the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase.

In the case of a single RF chain with multiple antennas, there is a need to determine or estimate separate propagation channels. A simple method may comprise switching to a first receive antenna utilizing, for example, an RF switch, and estimate a first propagation channel. After estimating the first propagation channel, another receive antenna may be selected and its corresponding propagation channel may be estimated. In this regard, this process may be repeated until all the channels have been estimated. However, switching between receive antennas may disrupt the receiver's modem and may lower throughput. Moreover, this approach may require additional hardware and may also result in propagation channel estimates at different time intervals.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

A method and/or system for pre-equalization in a single weight spatial multiplexing multi-input multi-output (MIMO) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
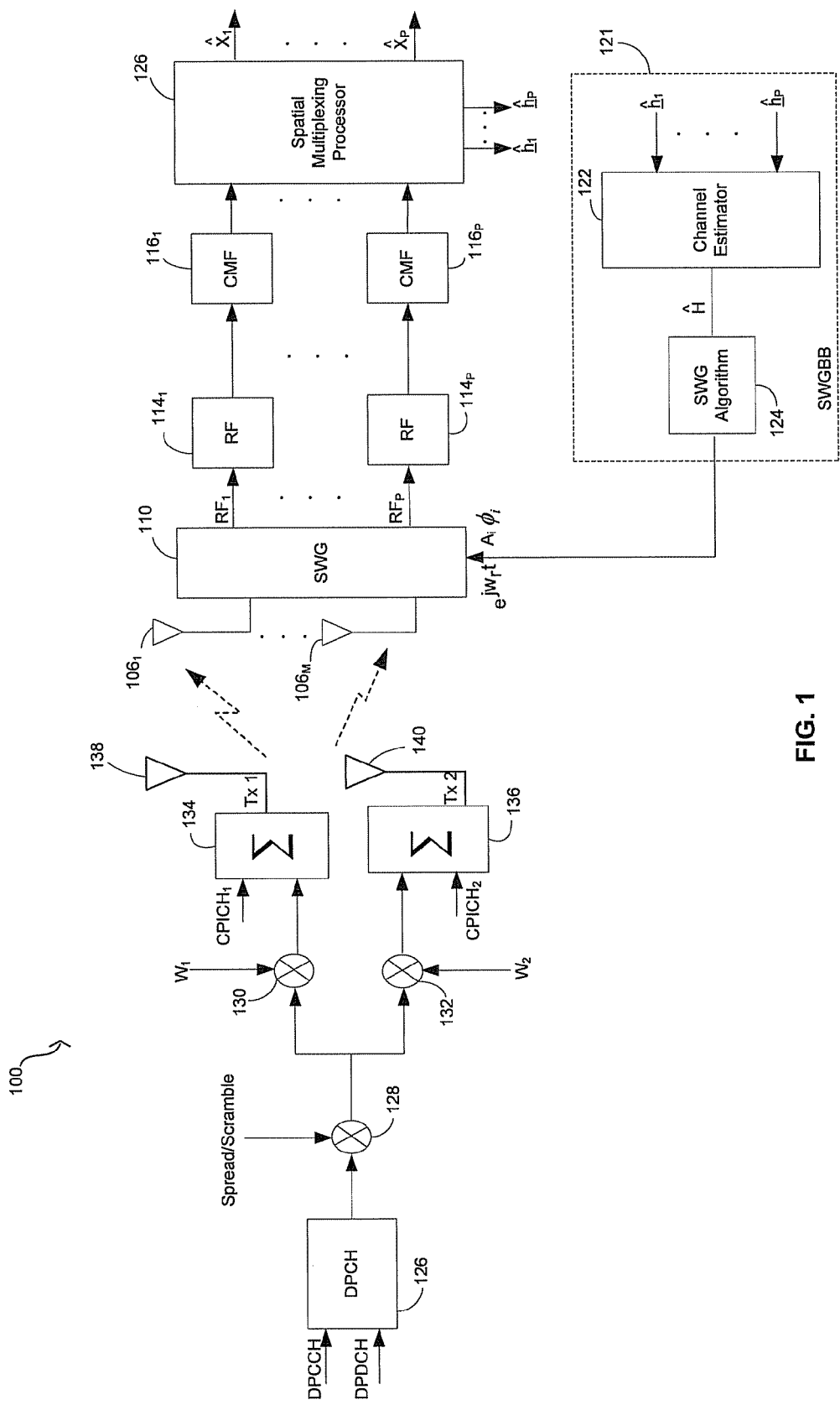
FIG. 1 is a block diagram of exemplary 2 Tx antenna and M Rx antenna spatially multiplexed wireless communication system with receiver channel estimation, in accordance with an embodiment of the invention.

Certain aspects of the method may comprise receiving a plurality of spatially multiplexed communication signals from a plurality of transmit antennas at a base station. A plurality of vectors of baseband combined channel estimates may be generated based on phase rotation of the received plurality of spatially multiplexed communication signals. A plurality of pre-equalization weights may be generated based on the generated plurality of vectors of baseband combined channel estimates. The received plurality of spatially multiplexed communication signals may be modified based on the generated plurality of pre-equalization weights. At least a portion of the generated plurality of pre-equalization weights may be fed back to the base station for modifying subsequently transmitted spatially multiplexed communication signals which are transmitted from at least a portion of the plurality of transmit antennas at the base station.

In another aspect of the method, the pre-equalization parameters may be generated based on least mean squares (LMS) algorithm, recursive least squares (RLS) algorithm, direct matrix inversion, and/or a cost function. In this regard, the parameters of the cost function may be modified in accordance with the application. The pre-equalization weights may be determined periodically or continuously. The pre-equalization weights may be fed back to a transmitter via an uplink channel. The received plurality of spatially multiplexed communication signals may be spatially demultiplexed. The various embodiments of the invention may provide a good compromise between implementation complexity and performance gains to reduce the effects of, for example, inter-symbol interference (ISI) and/or inter-carrier interference (ICI) in MIMO systems.

Spatial multiplexing (SM) may provide a mode of signal transmission predicated upon the use of multiple antennas at both a transmitter and a receiver, for example, in such a way that the capacity of a wireless radio link may be increased without correspondingly increasing power or bandwidth consumption. In a case in which N antennas are used at both a transmitter and a receiver, an input stream of information symbols provided to the transmitter is divided into N independent substreams. Spatial multiplexing contemplates that each of these N independent substreams may occupy the same "space-time channel", for example, time slot, frequency, or code/key sequence, of the applicable multiple-access protocol. Within the transmitter, each substream may be separately applied to the N transmit antennas and propagated over an intervening multipath communication channel to a receiver. Error correction coding may be applied to each of the N streams separately or in a combined space-time methodology.

The composite multipath signals may then be received by an array of N or more receive antennas deployed at the receiver. At the receiver, a "spatial signature" defined by the N phases and N amplitudes arising at the receive antenna array for a given substream may be then estimated. Signal processing techniques may be then applied in order to spatially separate the received signals, which may allow the original substreams to be recovered and synthesized into the original input symbol stream. An overall system capacity of the order of the minimum of M and N, min(M,N), for example, may be achieved, where M may be the number of receive antennas and N may be the number of transmit antennas for flat fading channel conditions. The principles of spatially multiplexed communication and exemplary system implementations are further described in, for example, "Optimum combining for indoor radio systems with multiple users", by J. H. Winters, IEEE Transactions on Communications, Vol. COM-35, No. 11, November 1987, which is hereby incorporated by reference in its entirety.

FIG. 1 is a block diagram of exemplary 2 Tx antenna and M Rx antenna spatially multiplexed wireless communication system with receiver channel estimation, in accordance with an embodiment of the invention. Referring to FIG. 1, the wireless system 100 may comprise a dedicated physical channel (DPCH) block 126, a plurality of mixers 128, 130 and 132, a plurality of combiners 134 and 136, a first transmit antenna (Tx 1) 138 and an additional transmit antenna (Tx 2) 140 on the transmit side. On the receive side, the wireless system 100 may comprise a plurality of receive antennas $106_{1...M}$, a single weight generator (SWG) 110, a plurality of RF blocks $114_{1...P}$, a plurality of chip matched filters (CMF) $116_{1...P}$, a spatially multiplexed baseband (SMBB) processor 126 and a single weight generator baseband processor (SWGBB) 121.

The SWGBB 121 may comprise a channel estimator 122 and a single weight generator (SWG) algorithm block 124.

The DPCH 126 may be adapted to receive a plurality of input channels, for example, a dedicated physical control channel (DPCCH) and a dedicated physical data channel (DPDCH). The DPCH 126 may simultaneously control the power of DPCCH and DPDCH. The mixer 128 may be adapted to mix the output of DPCH 126 with a spread and/or scrambled signal to generate a spread complex valued signal that may be input to mixers 130 and 132. The mixers 130 and 132 may weight the complex valued input signals with weight factors $W_1$ and $W_2$, respectively, and may generate outputs to a plurality of combiners 134 and 136 respectively. The combiners 134 and 136 may combine the outputs generated by mixers 130 and 132 with common pilot channel 1 (CPICH1) and common pilot channel 2 (CPICH2) respectively. The common pilot channels 1 and 2 may have a fixed channelization code allocation that may be utilized to measure the phase amplitude signal strength of the channels. The weights $W_1$ and $W_2$ may be utilized, for example, phase and or amplitude adjustments and may be generated by the single weight generator (SWG) algorithm block 124. The antennas 138 and 140 may receive the generated outputs from the combiners 134 and 136 and may transmit wireless signals.

The plurality of receive antennas $106_{1 \ldots M}$ may each receive at least a portion of the transmitted signal. The SWG 110 may comprise suitable logic, circuitry, and/or code that may be adapted to determine a plurality of weights to be applied to each of the input signals $R_{1 \ldots M}$. The SWG 110 may be adapted to modify the phase and amplitude of a portion of the transmitted signals received by the plurality of receive antennas $106_{1 \ldots M}$ and generate a plurality of output signals $RD_{1 \ldots P}$.

The plurality of RF blocks $114_{1 \ldots P}$ may comprise suitable logic, circuitry, and/or code that may be adapted to process an RF signal. The RF blocks $114_{1 \ldots P}$ may perform, for example, filtering, amplification, and analog-to-digital (ND) conversion operations. The plurality of transmit antennas 138 and 140 may transmit the processed RF signals to a plurality of receive antennas $106_{1 \ldots M}$. The single weight generator SWG 110 may comprise suitable logic, circuitry, and/or code that may be adapted to determine a plurality of weights, which may be applied to each of the input signals. The single weight generator SWG 110 may be adapted to modify the phase and amplitude of at least a portion of the signals received by the plurality of receive antennas $106_{1 \ldots M}$ and generate a plurality of output signals $RF_{1 \ldots P}$. The plurality of RF receive blocks $114_{1 \ldots P}$ may comprise suitable logic, circuitry and/or code that may be adapted to amplify and convert the received analog RF signals $RF_{1 \ldots P}$ down to baseband. The plurality of RF receive blocks $114_{1 \ldots P}$ may each comprise an analog-to-digital (A/D) converter that may be utilized to digitize the received analog baseband signal.

The plurality of chip matched filters (CMF) $116_{1 \ldots P}$ may comprise suitable logic, circuitry and/or code that may be adapted to filter the output of the plurality of RF receive blocks $114_{1 \ldots P}$ so as to produce in-phase (I) and quadrature (Q) components (I, Q). In this regard, in an embodiment of the invention, the plurality of chip matched filters (CMF) $116_{1 \ldots P}$ may comprise a pair of digital filters that are adapted to filter the I and Q components to within the bandwidth of WCDMA baseband (3.84 MHz). The outputs of the plurality of chip matched filters (CMF) $116_{1 \ldots P}$ may be transferred to the SMBB processor 126.

The SMBB 126 may be adapted to receive a plurality of in-phase and quadrature components (I, Q) from a plurality of chip matched filters (CMF) $116_{1 \ldots P}$ and generate a plurality of baseband combined channel estimates $\hat{h}_1$ to $\hat{h}_P$. The SMBB 126 may be adapted to generate a plurality of estimates $\hat{X}_1$ to $\hat{X}_P$ of the original input spatial multiplexing sub-stream signals or symbols $X_1$ to $X_P$. The SMBB 126 may be adapted to separate the different space-time channels utilizing a Bell Labs Layered Space-Time (BLAST) algorithm, for example, by performing sub-stream detection and sub-stream cancellation. The capacity of transmission may be increased almost linearly by utilizing the BLAST algorithm.

The channel estimator 122 may comprise suitable logic, circuitry, and/or code that may be adapted to process the received estimates $\hat{h}_1$ to $\hat{h}_P$ from the SMBB processor 126 and may generate a matrix $\bar{H}$ of processed estimated channels that may be utilized by the single weight generator (SWG) algorithm block 124.

The SWG algorithm block 124 may determine a plurality of amplitude and phase values $A_i$ and $\Phi_i$, respectively, which may be utilized by SWG 110 to modify the phase and amplitude of a portion of the transmitted signals received by the plurality of receive antennas $106_{1 \ldots M}$ and generate a plurality of output signals $RF_{1 \ldots P}$.

Figure 2A:
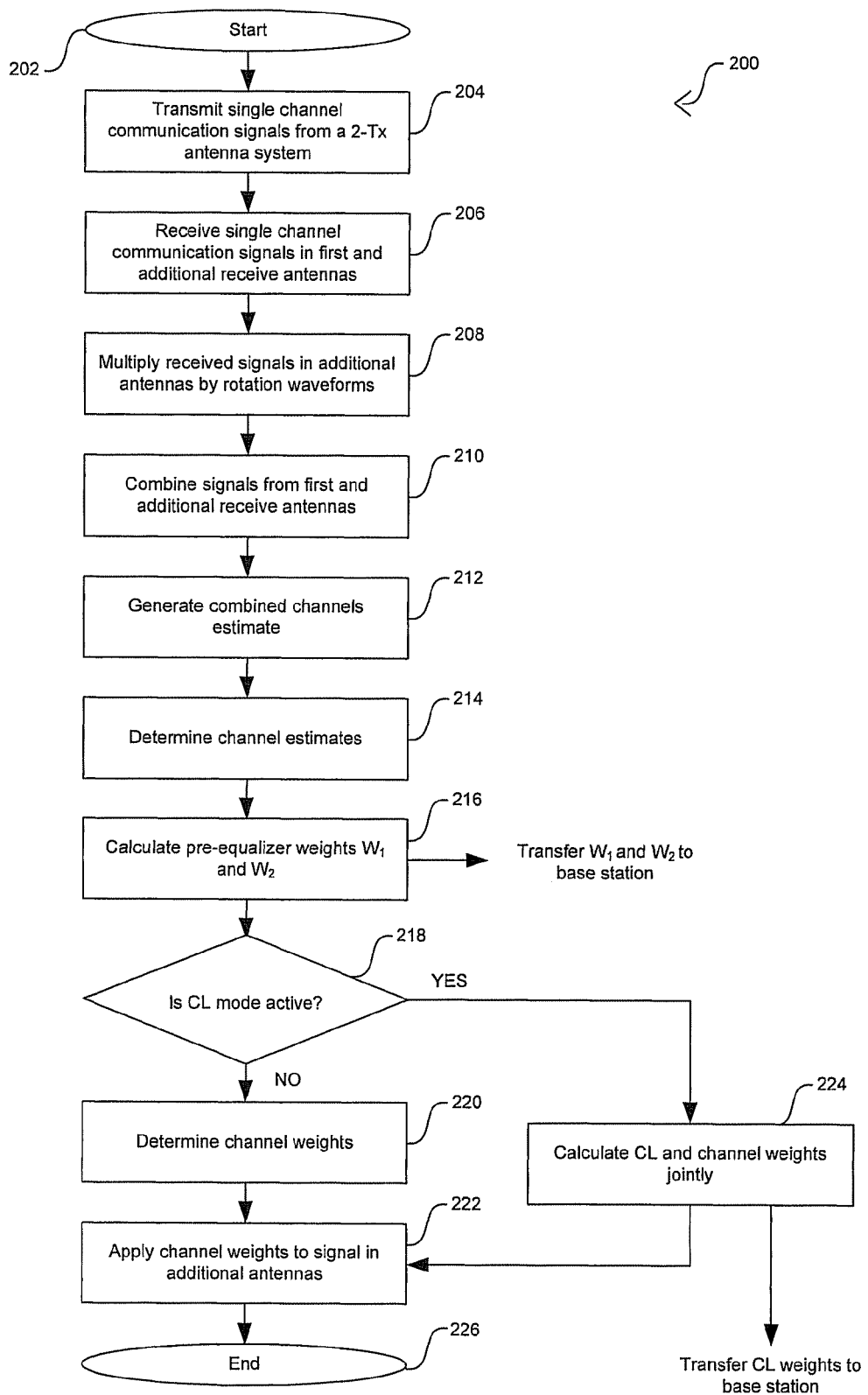
FIG. 2a is a flow diagram illustrating exemplary steps for channel estimation in a 2-Tx and M-Rx antennas wireless communication system, in accordance with an embodiment of the invention.

FIG. 2a is a flow diagram illustrating exemplary steps for channel estimation in a 2-Tx and M-Rx antennas wireless communication system, in accordance with an embodiment of the invention. Referring to FIG. 2a, after start step 202, in step 204, the single channel communication signals, $s_T$, may be transmitted from the transmit antennas Tx_1 138 and Tx_2 140 in FIG. 1E. In step 206, the first and additional receive antennas, Rx_1 106 to Rx_M 109, may receive a portion of the transmitted single channel communication signals. In step 208, the signals received by the additional receive antennas Rx_1 106 to Rx_M 109 may be multiplied by, for example, rotation waveforms, such as sine, square, or triangular waveforms for example, in the mixers 110 to 111. In this regard, the rotation waveforms may have a given set of amplitude and phase component values. In step 210, the output of the receive antenna Rx_1 106 and the output of the mixers 110 to 111 associated with the additional receive antennas Rx_2 108 to Rx_M 109 may be added or combined into the received single channel communication signal, $s_{RC}$. The combination may occur in the adder 112, for example.

In step 212, the CPP 118 may determine the first and second baseband combined channel estimates, $\hat{h}_1$ and $\hat{h}_2$, which comprise information regarding propagation channels $h_{11}$ to $h_{M1}$ and $h_{12}$ to $h_{M2}$. In step 214, the SWG channel estimator 122 in the SWBBG 121 may determine the matrix $\hat{H}_{M \times 2}$ of propagation channel estimates $\hat{h}_{11}$ to $\hat{h}_{M1}$ and $\hat{h}_{12}$ to $\hat{h}_{M2}$. In this regard, the propagation channel estimates $\hat{h}_{11}$ to $\hat{h}_{M1}$ and $\hat{h}_{12}$ to $\hat{h}_{M2}$ may be determined concurrently. In step 216, the pre-equalizer 125 may calculate or determine the pre-equalization weight parameters or weight factors $W_1$ and $W_2$ that may be applied to the mixers 130 and 132 in FIG. 1E respectively. The pre-equalization weights $W_1$ and $W_2$ may be transferred to a transmitter, such as a base station, to pre-equalize the signals being transmitted from the transmit antennas Tx_1 138 and Tx_2 140.

In step 218, the wireless communication system 150 may determine whether a closed loop operating mode that supports transmit diversity modes CL1 and CL2 is active. When the closed loop operating mode is active, the process may proceed to step 224. In step 224, the (M−1) maximum SNIR channel weights that comprise amplitude and phase components, $A_1$ to $A_{M-1}$ and $\phi_1$ to $\phi_{M-1}$, may be generated concurrently with the diversity pre-equalization weight parameters supported by CL1 or CL2. The channel weights may be based on the propagation channel estimates determined after the application of pre-equalization weight parameters $W_1$ and $W_2$ to the transmitter. The diversity pre-equalization weight parameters supported by CL1 or CL2 may be transferred to a transmitter, such as a base station, to pre-equalize the signals being transmitted from the transmit antennas Tx_1 138 and Tx_2 140. After step 224, the process may proceed to step 222.

Returning to step 218, when the closed loop operating mode is not active, the process may proceed to step 220. In step 220, the SWG algorithm block 124 may generate the (M−1) maximum SNIR channel weights that comprise amplitude and phase components, $A_1$ to $A_{M-1}$ and $\phi_1$ to $\phi_{M-1}$. In step 222, the (M−1) maximum SNIR channel weights may be applied to the mixers 110 to 111 in FIG. 1E.

After steps 222 or 224, the process may proceed to end step 226 where additional single channel communication signals received may be phase and amplitude adjusted based on the maximum SNIR channel weights applied to the mixers 110 to 111. The channel estimation phase rotation and the maximum SINR phase/amplitude adjustment described in flow chart 200 may be performed continuously or may be performed periodically.

Figure 2B:
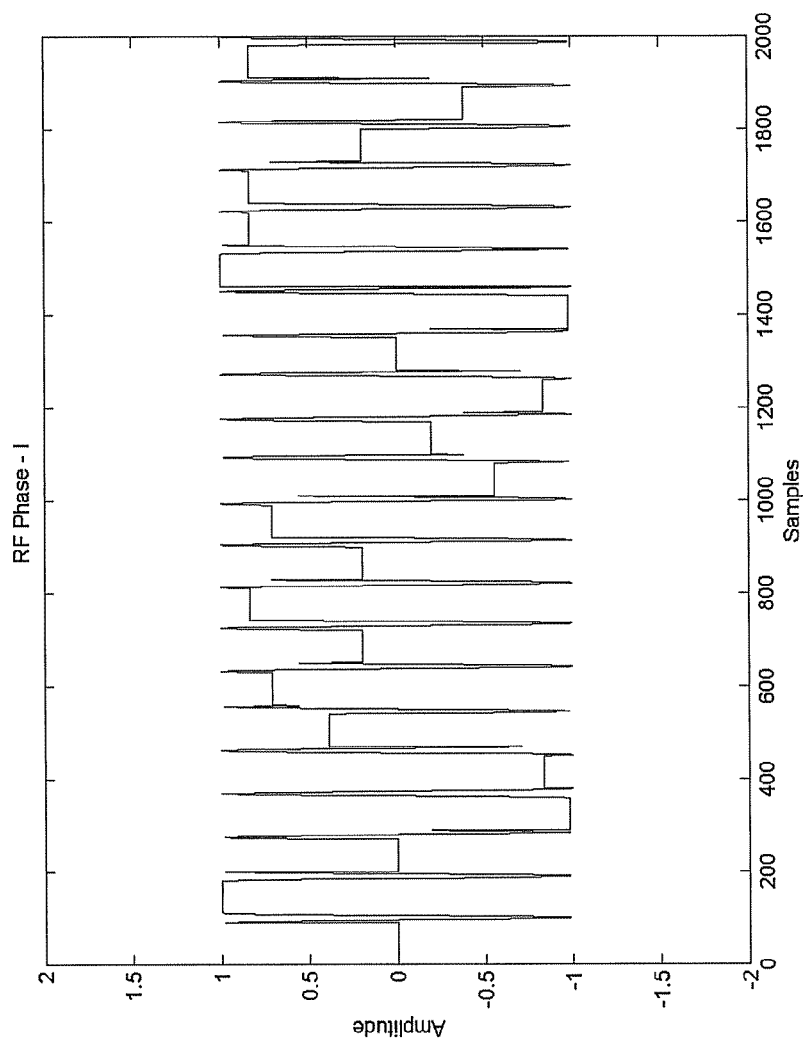
FIG. 2b illustrates an exemplary periodic phase rotation for an in-phase (I) signal received in one of the additional receive antennas, in accordance with an embodiment of the invention.

FIG. 2b illustrates an exemplary periodic phase rotation for an I signal component, in accordance with an embodiment of the invention. Referring to FIG. 2b, for the wireless system 100 in FIG. 1, by rotating the phase at the receive antennas $106_{1...M}$ from 0 to 360 degrees, it may be possible to estimate propagation channels, $h_{1...M}$, at the same time utilizing complex multiplication and integration. This operation is equivalent to orthogonalizing all the channels at the Rx antennas. FIG. 2b illustrates the periodic rotation of the I component in an RF signal.

Figure 3A:
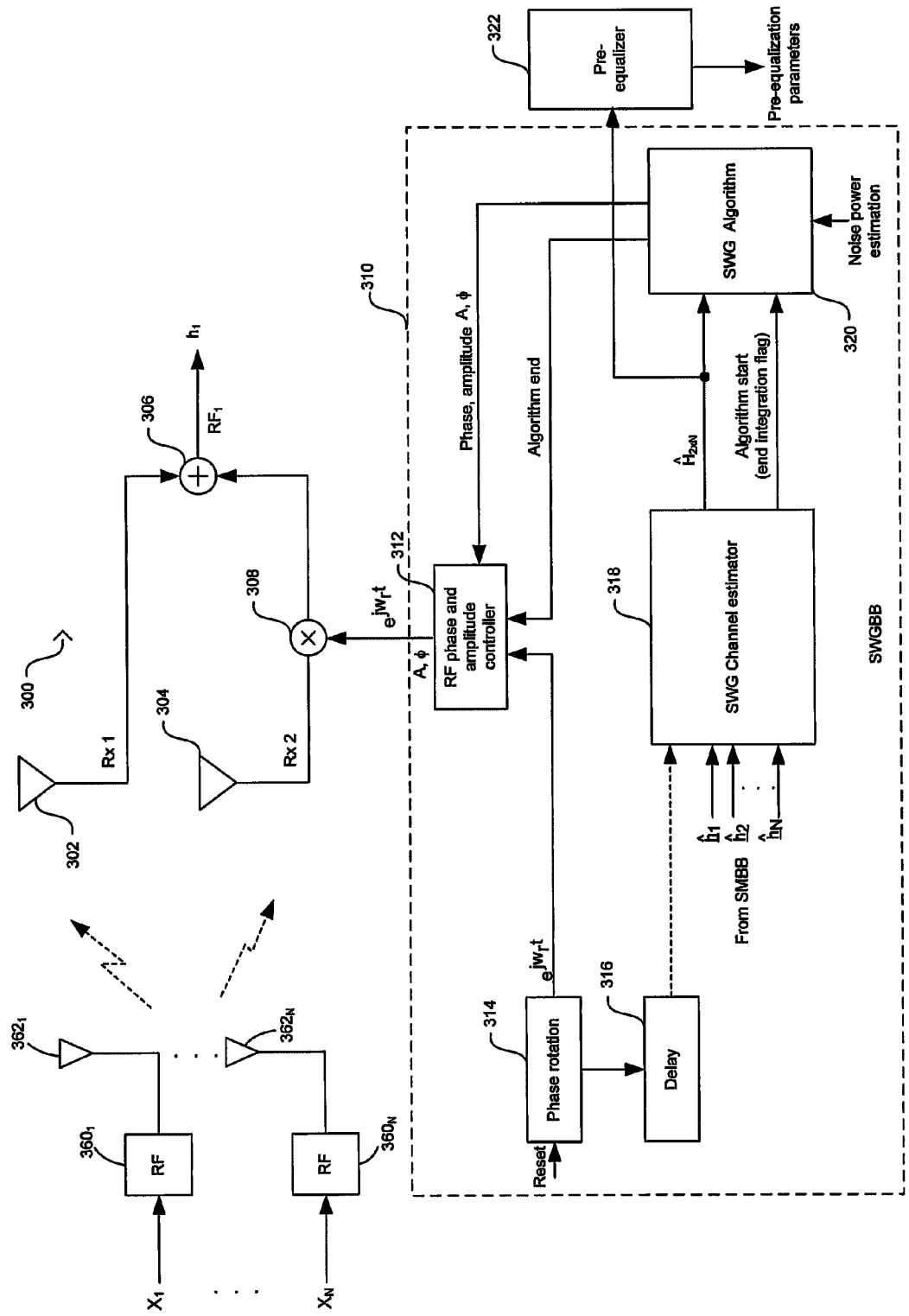
FIG. 3A is a block diagram of an exemplary system for providing phase rotation, channel estimation and for determining optimal phase and amplitude parameters or setting for an additional receive antenna, in accordance with an embodiment of the invention.

FIG. 3A is a block diagram of an exemplary system for providing phase rotation, channel estimation and for determining optimal phase and amplitude parameters or settings for an additional receive antenna, in accordance with an embodiment of the invention. Referring to FIG. 3A, a receiver system 300 may comprise a first receive antenna Rx 1 302, an additional antenna Rx 2 304, a combiner 306, a complex multiplier 308, and a single weight generator baseband (SWGBB) processor 310. The SWGBB processor 310 may comprise a phase rotation start controller block 314, a delay block 316, a SWG channel estimator 318, a single weight generator (SWG) algorithm block 320, a RF phase and amplitude controller 312 and a pre-equalizer 322. The SWGBB processor 310 provides similar functionality as the SMBB processor 126 in FIG. 1.

The receive antennas Rx 1 302 and Rx 2 304 may each receive a portion of the transmitted signal. The combiner 306 may be adapted to combine the received signals into a single RF signal $RF_1$, for example. The complex multiplier 308 may be adapted to receive a plurality of input signals from the additional receive antenna Rx 2 304 and the RF phase and amplitude controller 312 and may generate an output signal to the combiner 306.

The phase rotation start controller block 314 may comprise suitable logic, circuitry and/or that may be adapted to start after receiving a reset signal and may generate a plurality of output signals to the delay block 316 and the RF phase and amplitude controller 312. The delay block 316 may be adapted to receive an input signal from the phase rotation start controller block 314 and generate a delayed output signal to the SWG channel estimator 318. The SWG channel estimator 318 may comprise suitable logic, circuitry, and/or code that may be adapted to process the received baseband combined channel estimates per transmit antenna $\hat{h}_1 \ldots \hat{h}_N$ from the SMBB processor 126 and may generate a matrix $\hat{H}_{2 \times N}$ of processed estimated channels. The SWG channel estimator 318 may be adapted to generate an algorithm start signal indicating the end of integration that may be utilized by the single weight generator (SWG) algorithm block 320.

The SWG algorithm block 320 may be adapted to receive a plurality of signals from the SWG channel estimator 318, for example, a matrix $\hat{H}_{2 \times N}$ of processed baseband combined channel estimates, an algorithm start signal from the SWG channel estimator 318 and a noise power estimation signal. The SWG algorithm block 320 may generate phase and amplitude correction signals and an algorithm end signal to the RF phase and amplitude controller 312. The RF phase and amplitude controller 312 may be adapted to receive the phase and amplitude values and the algorithm end signal to modify the phase and amplitude of a portion of the transmitted signals received by the receive antenna Rx 2 302 and generate an output signal $RF_1$. The pre-equalizer 322 may comprise suitable logic, circuitry, and/or code that may be adapted to determine a plurality of pre-equalization parameters based on the matrix $\hat{H}_{2 \times N}$ of propagation channel estimates $\hat{h}_{11} \ldots \hat{h}_{1N}$, $\hat{h}_{21} \ldots \hat{h}_{2N}$. In this regard, the pre-equalizer may be adapted to generate pre-equalization weight parameters or weight factors $W_1$ and $W_2$ and/or closed loop diversity pre-equalization weight parameters.

The SWG channel estimator 318 may receive baseband combined channel estimates $\hat{h}_1 \ldots \hat{h}_N$, which may include all transmission channels from N Tx antennas and each Tx antenna may have a different channel estimation sequence, so that the different combined channels $\hat{h}_1 \ldots \hat{h}_N$ may be separated and estimated. The SWG channel estimator 318 may generate a matrix of channel estimates $\hat{H}_{2 \times N}$ to the SWG algorithm block 320. A reset signal may be utilized to start the phase rotation block 314. The combined channel estimates from the SMBB 126 in FIG. 1 may be transferred to the channel estimator 318 for processing. When processing is complete, the SWG channel estimator 318 may indicate to the SWG algorithm block 320 that the determination of the appropriate phase and amplitude correction for the portion of the received signal in the additional antenna Rx 2 304 may start. The SWG algorithm block 320 may utilize an estimation of the noise power and interference in determining the phase and amplitude values in addition to the matrix of channel estimates $\hat{H}_{2 \times N}$. The SWG algorithm block 320 may indicate to the RF phase and amplitude controller 312 the end of the weight determination operation and may then transfer to the RF phase and amplitude controller 312, the determined phase and amplitude values. The RF phase and amplitude controller 312 may then modify the portion of the received signal in the additional antenna Rx 2 304 via the complex multiplier 308.

In operation, the RF phase and amplitude controller 312 may apply the signal $e^{jwr}r'$ to the mixer 308 in FIG. 3A based on control information provided by the phase rotator start controller 314. The switch 340 may select the rotation waveform source 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signal $Ae^{j\phi}$ to the mixer 308 in FIG. 3A.

Figure 3B:
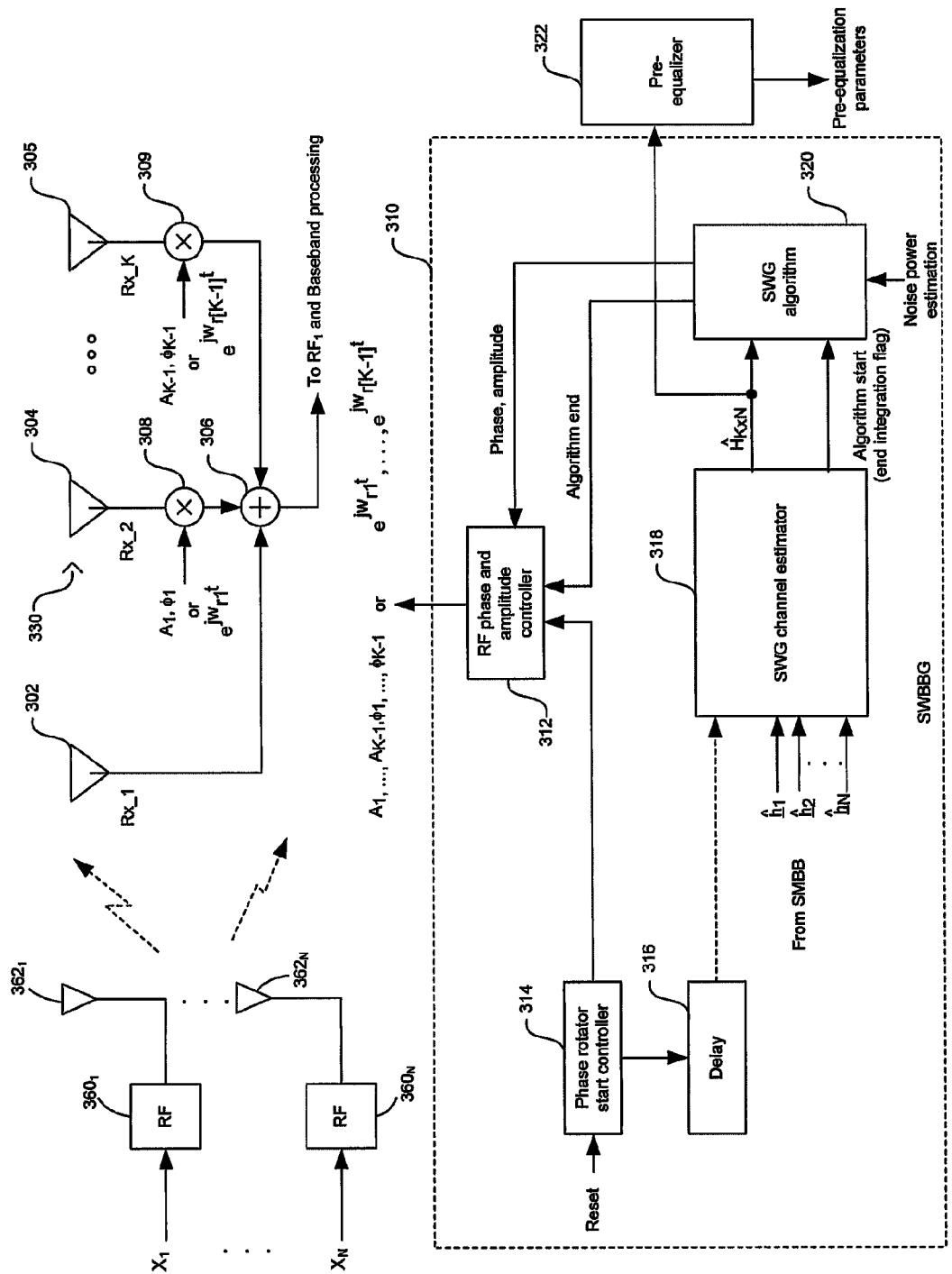
FIG. 3B is a block diagram of an exemplary system for providing phase rotation, channel estimation and for determining optimal phase and amplitude parameters or setting for additional K−1 receive antennas, in accordance with an embodiment of the invention.

FIG. 3B is a block diagram of an exemplary system for providing phase rotation, channel estimation and for determining optimal phase and amplitude parameters or setting for additional K−1 receive antennas, in accordance with an embodiment of the invention. Referring to FIG. 3B, a receiver system 330 may correspond to a portion of the wireless communication system 100 in FIG. 1 and may differ from the receiver system 300 in FIG. 3A in that (K−1) additional receive antennas, Rx_2 304 to Rx_K 305, and (K−1) mixers 308 to 309 may be utilized. The combiner 306 may combine the received signals into a single RF signal $RF_1$, for example. In this regard, the SWG channel estimator 318 may be adapted to process the combined channel estimates, $\hat{h}_1 \ldots \hat{h}_N$, and determine the propagation channel matrix estimate $\hat{H}_{K \times N}$.

Referring to the FIG. 1, multiple receive antennas may be connected to each of the RF chains $RF_1 \ldots RF_N$ as shown in FIG. 3B for the single RF chain $RF_1$. In this regard, the combined channel estimates $\hat{h}_1 \ldots \hat{h}_N$ and consequently the channel estimate matrix $\hat{H}_{K \times N}$ may be determined per each RF chain $RF_1 \ldots RF_N$. Consequently, following this example, N matrices $\hat{H}_{K \times N}$ may form a channel estimate matrix $\hat{H}_{M \times N}$ in FIG. 1 (M=NK).

The SWG algorithm block 320 may also be adapted to determine (K−1) channel weights per RF chain, that may be utilized to maximize receiver SINR, for example, to be applied to the mixers 308 to 309 to modify the portions of the transmitted single channel communication signals received by the additional receive antennas Rx_2 304 to Rx_K 305. The (K−1) channel weights per RF chain may comprise amplitude and phase components, $A_1$ to $A_{K-1}$ and $\phi_1$ to $\phi_{K-1}$. The RF phase and amplitude controller 312 may also be adapted to apply rotation waveforms $e^{jw_r 1 t}$ to $e^{jw_r(K-1)t}$ or phase and amplitude components, $A_1$ to $A_{K-1}$ and $\phi_1$ to $\phi_{K-1}$, to the mixers 308 to 309. In this regard, the RF phase and amplitude controller 312 may apply the rotation waveforms or the amplitude and phase components in accordance with the control signals provided by the phase rotator start controller 314 and/or the algorithm end signal generated by the SWG algorithm block 320. The pre-equalizer 322 in FIG. 3B may also be adapted to determine a plurality of pre-equalization parameters based on the matrix $\hat{H}_{K \times N}$ of propagation channel estimates $\hat{h}_{11} \ldots \hat{h}_{1N}, \hat{h}_{21} \ldots \hat{h}_{2N}, \ldots, \hat{h}_{K1} \ldots \hat{h}_{KN}$.

Figure 3C:
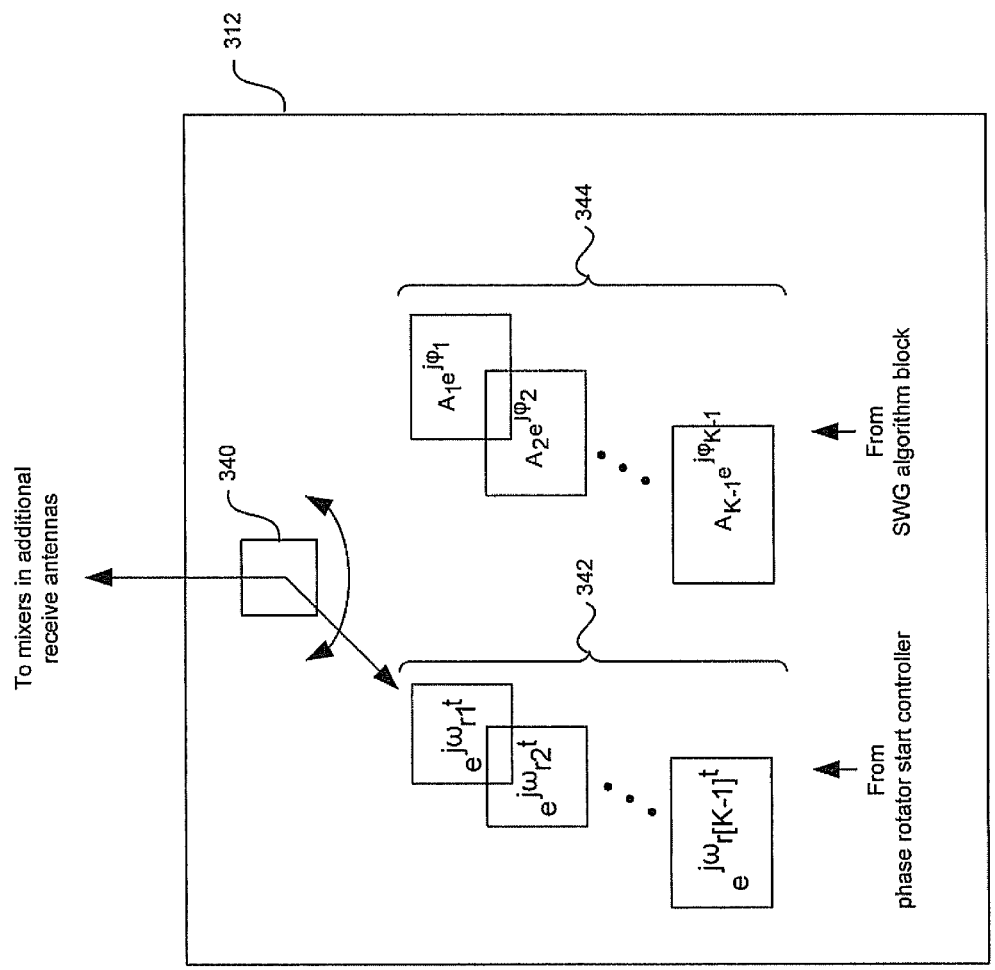
FIG. 3C is a block diagram of an exemplary RF phase and amplitude controller, in accordance with an embodiment of the invention.

FIG. 3C is a block diagram of an exemplary RF phase and amplitude controller, in accordance with an embodiment of the invention. Referring to FIG. 3C, the RF phase and amplitude controller 312 may comprise a switch 340, rotation waveform sources 342, and a plurality of SWG algorithm determined weights 344. The switch 340 may comprise suitable hardware, logic, and/or circuitry that may be adapted to select between the rotation waveforms $e^{jw_r 1 t}$ to $e^{jw_r(K-1)t}$ and the SWG algorithm determined weights $A_1 e^{j\phi} 1$ to $A_{K-1} e^{j\phi_{K-1}}$. The rotation waveform source 342 may comprise suitable hardware, logic and/or circuitry that may be adapted to generate the signal $e^{jw_{rk}t}$, where $w_{rk}=2\pi f_{rk}$, and $f_{rk}$ is the rotation frequency that preserves orthogonality of the received signals at the multiple receiving antennas. The rotation frequency that preserves the signal orthogonality at the receiving antennas may be selected as $w_{rk}=kw_r$ where k=1, 2, 3 . . . K−1. Other rotation waveforms such as triangular or square may be utilized with the same frequency relationships. In addition, waveforms representing different orthogonal codes of the same frequency may be utilized, similar to the CDMA orthogonal codes with the same spreading. In this embodiment $e^{jw_{rk}t}$ is used as an exemplary waveform. The weights 344 may comprise suitable hardware, logic, and/or circuitry that may be adapted to generate the signals $A_1 e^{j\phi} 1$ to $A_{K-1} e^{j\phi_{K-1}}$ from the amplitude and phase components, $A_1$ to $A_{K-1}$ and $\phi_1$ to $\phi_{K-1}$, respectively.

In operation, the RF phase and amplitude controller 312 may apply the signals $e^{jw_r 1 t}$ to $e^{jw_r(K-1)t}$ to the mixers 308 to 309 in FIG. 3B based on control information provided by the phase rotator start controller 314. The switch 340 may select the rotation waveform source 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signals $A_1 e^{j\phi} 1$ to $A_{K-1} e^{j\phi_{M-1}}$ to the mixers 308 to 309 in FIG. 3B.

Figure 4A:
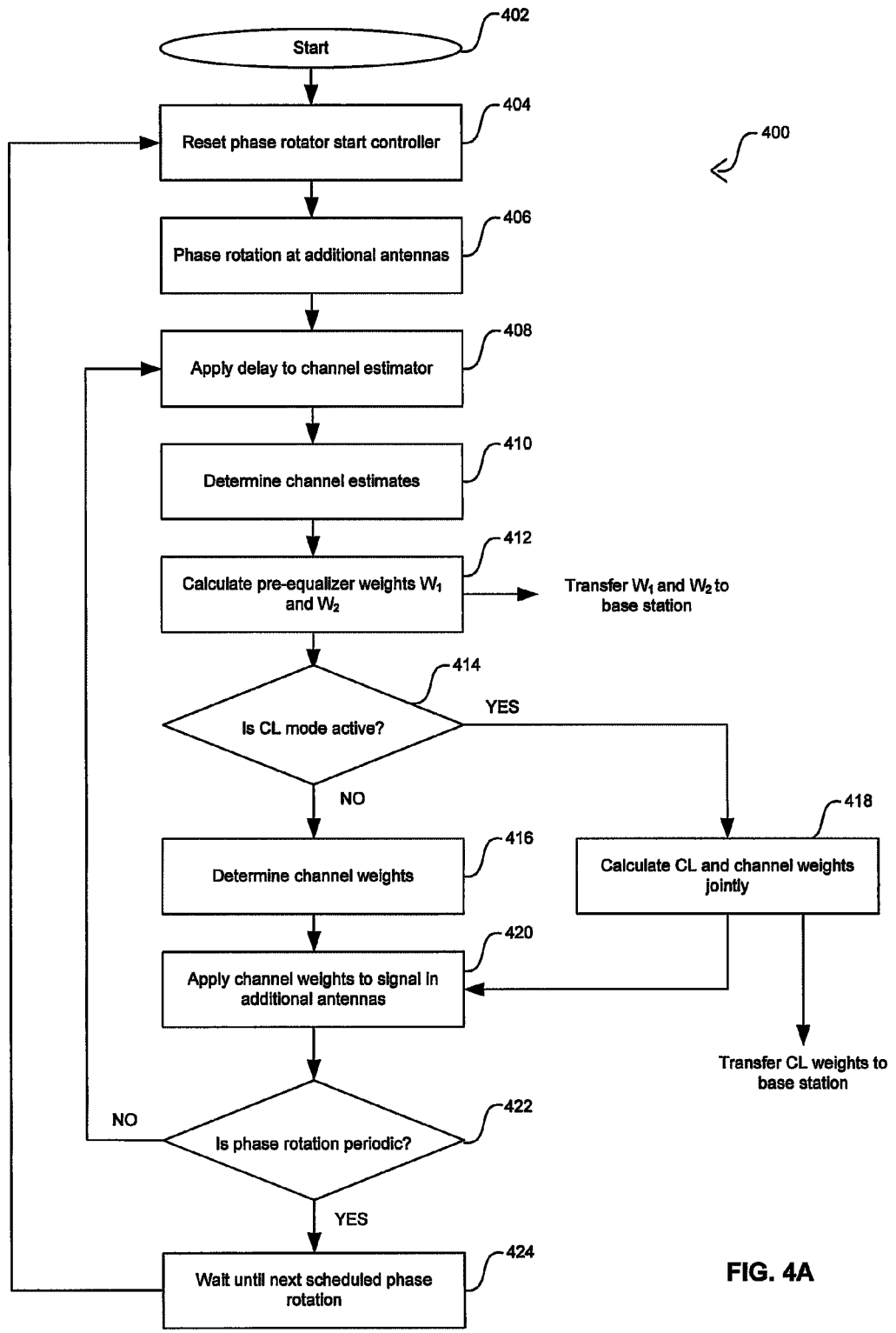
FIG. 4a is a flow diagram illustrating exemplary steps for determining channel weight utilizing SINR or SNR in an additional receive antenna, in accordance with an embodiment of the invention.

FIG. 4a is a flow diagram illustrating exemplary steps in the operation of the single weight baseband generator (SWBBG) that may be utilized in a 2-Tx and M-Rx antennas system, in accordance with an embodiment of the invention. Referring to FIG. 4a, after start step 402, in step 404, the phase rotator start controller 314 in FIG. 3B may receive the reset signal to initiate operations for determining propagation channel estimates and channel weights in the SWBBG 310. The phase rotator start controller 314 may generate control signals to the delay block 316 and to the RF phase and amplitude controller 312. The control signals to the delay block 316 may be utilized to determine a delay time to be applied by the delay block 316. The control signals to the RF phase and amplitude controller 312 may be utilized to determine when to apply the rotation waveforms or the channel weights determined by the SWG algorithm block 124 to the mixers 308 to 309 in FIG. 3B, for example.

In step 406, the RF phase and amplitude controller 312 may apply the signals $e^{jw_r 1 t}$ to $e^{jw_r(K-1)t}$ to the mixers 308 to 309 in FIG. 3B. In step 408, the delay block 316 may apply a time delay signal to the SWG channel estimator 318 to reflect the interval of time that may occur between receiving the combined channel estimates, $\hat{h}_1$ and $\hat{h}_2$, modified by the rotation waveform and the actual rotating waveform at the mixer 308. For example, the time delay signal may be utilized as an enable signal to the SWG channel estimator 318, where the assertion of the time delay signal initiates operations for determining propagation channel estimates. In step 410, the SWG channel estimator 318 may process the first and second baseband combined channel estimates, $\hat{h}_1$ and $\hat{h}_2$, and may determine the matrix $\hat{H}_{2 \times N}$ of propagation channel estimates $\hat{h}_{11}$ to $\hat{h}_{1N}$ and $\hat{h}_{21}$ to $\hat{h}_{2N}$. The SWG channel estimator 318 may transfer the propagation channel estimates $\hat{h}_{11}$ to $\hat{h}_{1N}$ and $\hat{h}_{21}$ to $\hat{h}_{2N}$ to the SWG algorithm block 320. In step 412, the pre-equalizer 322 may calculate or generate the pre-equalization weight parameters or weight factors $W_1$ and $W_2$. The pre-equalization weight parameters may be transferred to a wireless transmitter, such as a base station.

In step 414, the receiver system 330 in FIG. 3B may determine whether a closed loop operating mode that supports transmit diversity modes CL1 and CL2 is active. When the closed loop operating mode is active, the process may proceed to step 418. In step 418, the (M−1) maximum SNIR channel weights that comprise amplitude and phase components, $A_1$ to $A_{K-1}$ and $\phi_1$ to $\phi_{K-1}$, may be generated concurrently with the diversity pre-equalization weight parameters supported by CL1 or CL2. The channel weights may be based on the propagation channel estimates determined after the application of pre-equalization weight parameters $W_1$ and $W_2$ to the transmitter. The diversity pre-equalization weight parameters supported by CL1 or CL2 may be transferred to a transmitter, such as a base station, to pre-equalize the signals being transmitted. After step 418, the process may proceed to step 420.

Returning to step 414, when the closed loop operating mode is not active, the process may proceed to step 416. In step 416, the SWG algorithm block 320 may generate the (M−1) maximum SNIR channel weights that comprise amplitude and phase components, $A_1$ to $A_{K-1}$ and $\phi_1$ to $\phi_{K-1}$, based on the propagation channel estimates $\hat{h}_{11}$ to $\hat{h}_{1N}$ and $\hat{h}_{21}$ to $\hat{h}_{2N}$ and/or noise power estimates and interference channel estimates, for example. The SWG algorithm block 320 may transfer the channel weights to the RF phase and amplitude controller 312. The SWG algorithm block 320 may generate the algorithm end signal to indicate to the RF phase and amplitude controller 312 that the channel weights are available to be applied to the mixers 308 to 309. In step 420, RF phase and amplitude controller 312 may apply the maximum SNIR weights with phase and amplitude components, $A_1$ to $A_{K-1}$ and $\phi_1$ to $\phi_{K-1}$, to the mixers 308 to 309 in FIG. 3B, in accordance with the control signals provided by the phase rotator start controller 314 and/or the SWG algorithm block 320.

In step 422, the receiver system 330 in FIG. 3B may determine whether the phase rotation operation on the received single channel communication signals is periodic. When the phase rotation operation is not periodic but continuous, the process may proceed to step 408 where a new delay may be applied to the SWG channel estimator 318. In instances when the phase rotation operation is periodic, the process may proceed to step 424 where the receiver system 330 may wait until the next phase rotation operation is initiated by the reset signal. In this regard, the process may return to step 404 upon assertion of the reset signal on the phase rotator start controller 314.

Figure 4B:
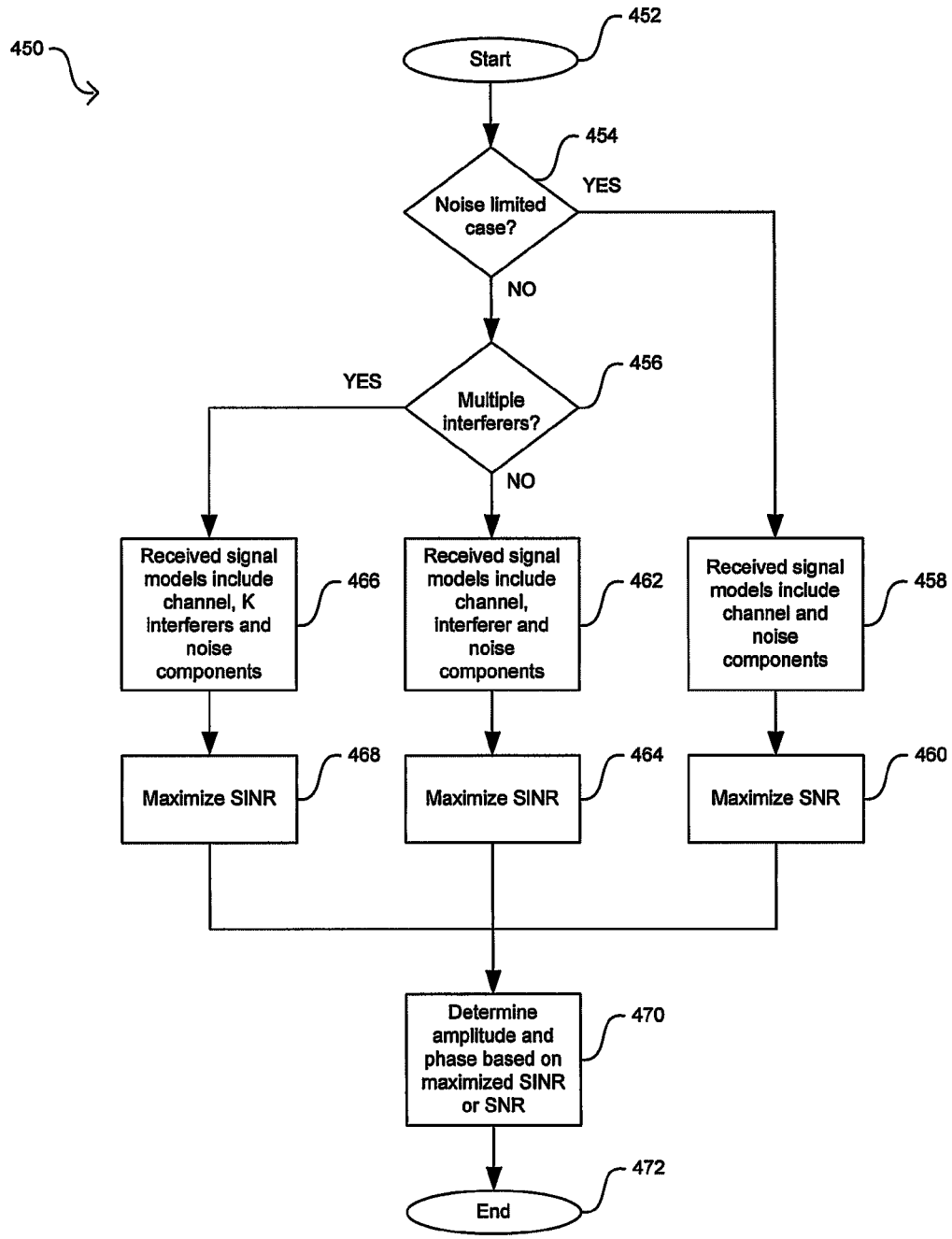
FIG. 4b is a flow diagram illustrating exemplary steps for determining channel weight by monitoring phase rotation, in accordance with an embodiment of the invention.

FIG. 4b is a flow diagram illustrating exemplary steps for determining channel weights in additional receive antennas utilizing signal-to-noise ratio (SNR) or signal-to-interference-and-noise ratio (SINR), in accordance with an embodiment of the invention. Referring to FIG. 4b, after start step 452, in step 454, the SWG algorithm block 320 may determine whether the signals received in the receive antennas are noise limited. The SWG algorithm block 320 may receive noise statistics and/or other noise information from either the CPP $516_1 \ldots p$ (FIG. 5) and/or from the spatial multiplexing processor 518. When the received signals are noise limited, the flow diagram control may proceed to step 458. In step 458, the SWG algorithm block 320 may generate models for the received signals. For example, the models for a 1-Tx and 2-Rx antennas system may be represented by the following expressions:

$$r_1 = h_1 s + n_1,$$

$$r_2 = A e^{j\theta} h_2 s + A e^{j\theta} n_2, \text{ and}$$

$$y = r_1 + r_2 = s(h_1 + A e^{j\theta} h_2) + n_1 + A e^{j\theta} n_2,$$

where $r_1$ may represent a model of the signal received in a first receive antenna, $r_2$ may represent a model of the signal received in the second receive antenna, s may represent the transmitted signal, and $n_1$ may represent a noise component at the first receive antenna, whose time varying impulse response is represented by $h_1$. The parameter $n_2$ may represent a noise component at the second receive antenna, whose time varying impulse response is represented by $h_2$, $\theta$ may represent the phase factor between the signal received in the first and second receive antennas, and A may represent an amplitude factor. The parameter y may represent the sum of the received signal models and may comprise a combined signal component $s(h_1 + A e^{j\theta} h_2)$ and a combined noise component $n_1 + A e^{j\theta} n_2$.

For the case of a MIMO system with N-transmit and M-receive antennas, the models may be represented by the expressions:

$$r_k = \sum_{i=1}^{N} (A_k e^{j\theta} k h_{ik} s + A_k e^{j\theta} k n_k),$$

$$y = \sum_{k=1}^{M} (r_k),$$

where $r_k$ may represent the model of the signal received from the N transmit antennas by the $k^{th}$ receive antenna, $h_{ik}$ may represent the time varying impulse response of the propagation channel between the $i^{th}$ transmit antenna and the $k^{th}$ receive antenna, and s may represent the transmitted signal, $n_k$ may represent a noise component at the $k^{th}$ receive antenna. The parameter $A_k$ may correspond to the amplitude factor associated with the $k^{th}$ receive antenna, $\theta_k$ may correspond to the phase factor associated with the $k^{th}$ receive antenna, and y may represent the sum of the M received signal models. In this regard, $A_k(k=1)=1$ and $\theta_k(k=1)=0$.

In step 460, the received signal models may be utilized to determine a signal strength parameter. In this regard, the signal-to-noise ratio (SNR) may correspond to the signal strength parameter to be determined. For example, for a 1-Tx and 2-Rx antennas system, the SNR may be determined by maximizing the following expression for various phase, $\theta$, and amplitude, A, factors:

$$SNR = \frac{\|h_1 + A e^{j\theta} h_2\|^2}{E\|n_1\|^2 + E\|A e^{j\theta} n_2\|^2} = \frac{\|h_1 + A e^{j\theta} h_2\|^2}{\sigma^2(1 + A^2)}.$$

The SNR numerator may correspond to the y parameter's combined signal component while the SNR denominator may correspond to the y parameter's combined noise component. The phase factor, $\theta$, may be selected, for example, from a 360-degrees phase rotation while the amplitude factor, A, may be selected, for example, from an set amplitude range. In one embodiment of the invention, the phase factor may be varied in a plurality of phase factor steps over the 360-degrees phase rotation to find the maximum SNR value. In another embodiment of the invention, the phase factor may be varied in a plurality of phase factors steps over the 360-degrees phase rotation and the amplitude factor may be varied in a plurality of amplitude factor values over the amplitude range to find the maximum SNR value.

In step 470, after determining the maximum SNR in step 460, the SWG algorithm block 320 may utilize the amplitude factor and phase factor that corresponds to the maximum SNR to determine the amplitude and phase to be provided to the RF amplitude and phase controller 312 in step 470. For example, in one embodiment of the invention, the amplitude and/or phase factors that correspond to the maximum SNR may be utilized as the amplitude and phase to be transferred to the RF amplitude and phase controller 312. After application of the appropriate amplitude and phase by the RF amplitude and phase controller 312 to the receive antennas, the flow diagram control may proceed to end step 472 until a next phase and amplitude determination is necessary.

Returning to step 454, when received signals are not noise limited, the flow control may proceed to step 456 where a determination may be made as to whether multiple interfering signals may be present and may need to be considered during channel weight determination. When a single interferer is considered, the flow diagram control may proceed to step 462. In step 462 the SWG algorithm block 320 may generate models for the received signals. For example, the models for a 1-Tx and 2-Rx antennas system may be represented by the following expressions:

$$r_1 = h_1 s + h_{I1} s_I + n_1,$$

$$r_2 = Ae^{j\theta}(h_2 s + h_{I2} s_I + n_2), \text{ and}$$

$$y = r_1 + r_2 = s(h_1 + Ae^{j\theta} h_2) + n_1 + s_I(h_{I1} + Ae^{j\theta} h_{I2}) + Ae^{j\theta} n_2,$$

where $r_1$ may represent a model of the signal received in a first receive antenna, $r_2$ may represent a model of the signal received in the second receive antenna, s may represent the transmitted signal, $s_I$ may represent the interference signal, and $n_1$ may represent a noise component at the first receive antenna whose time varying impulse response is $h_1$. The parameter $n_2$ may represent a noise component at the second receive antenna whose time varying impulse response is $h_2$, $\theta$ may represent the phase factor between the signal received in the first and second receive antennas, and A may represent an amplitude factor. Moreover, the time varying impulse response $h_{I1}$ may correspond to the propagation channel between the interference signal source and the first receive antenna and the time varying impulse response $h_{I2}$ may correspond to the propagation channel between the interference signal source and the second receive antenna. The parameter y may represent the sum of the received signal models and may comprise a combined signal component $s(h_1 + Ae^{j\theta} h_2)$ and a combined noise plus interference component $n_1 + s_I(h_{I1} + Ae^{j\theta} h_{I2}) + Ae^{j\theta} n_2$.

For the case of a MIMO system with N-transmit and M-receive antennas, the models may be represented by the expressions:

$$r_k = \sum_{i=1}^{N} (A_k e^{j\theta} k h_{ik} s + A_k e^{j\theta} k h_{ik} s_I + A_k e^{j\theta} k n_k),$$

$$y = \sum_{k=1}^{M} (r_k),$$

where $r_k$ may represent the model of the signal received from the N transmit antennas by the $k^{th}$ receive antenna, $h_{ik}$ may represent the propagation channel between the $i^{th}$ transmit antenna and the $k^{th}$ receive antenna, s may represent the transmitted signal, $s_I$ may represent the interference signal, $n_k$ may represent a noise component at the $k^{th}$ receive antenna, $h_{Ik}$ may represent the time varying impulse response of propagation channel between the interference source and the $k^{th}$ receive antenna. The parameter $A_k$ may correspond to the amplitude factor associated with the $k^{th}$ receive antenna, $\theta_k$ may correspond to the phase factor associated with the $k^{th}$ receive antenna, and y may represent the sum of the M received signal models. In this regard, $A_k(k=1)=1$ and $\theta_k(k=1)=0$.

In step 464, the received signal models may be utilized to determine a signal strength parameter. In this regard, the signal-to-interference-and-noise ratio (SINR) may correspond to the signal strength parameter to be determined. For example, for a 1-Tx and 2-Rx antennas system, the SINR may be determined by maximizing the following expression for various phase, $\theta$, and amplitude, A, factors:

$$SINR = \frac{\|h_1 + Ae^{j\theta} h_2\|^2}{E\|n_1\|^2 + E\|Ae^{j\theta} n_2\|^2 + \|h_{I1} + Ae^{j\theta} h_{I2}\|^2}$$

-continued $$= \frac{\|h_1 + Ae^{j\theta} h_2\|^2}{\sigma^2(1 + A^2) + \|h_{I1} + Ae^{j\theta} h_{I2}\|^2}.$$

where $\sigma^2$ is the noise power. The above SINR equations may be easily extended, by one skilled in art, to the single channel MIMO case.

The transmit antennas may include CL1 or C2 transmit diversity weights. The joint transmit-received solution may be formed in that case that may include the transmit CL weights and the additional transmit antenna channel components in the SINR numerator. The SINR numerator may correspond to the y parameter's combined signal component while the SINR denominator may correspond to the y parameter's combined noise plus interference component. The phase factor, □, may be selected, for example, from a 360-degrees phase rotation while the amplitude factor, A, may be selected, for example, from an set amplitude range. In one embodiment of the invention, the phase factor may be varied in a plurality of phase factor steps over the 360-degrees phase rotation to find the maximum SNR value. In another embodiment of the invention, the phase factor may be varied in a plurality of phase factors steps over the 360-degrees phase rotation and the amplitude factor may be varied in a plurality of amplitude factor values over a range of amplitudes to find the maximum SINR value.

After determining the SINR in step 464, the SWG algorithm block 320 may determine the amplitude and phase to be provided to the RF amplitude and phase controller 312 in step 470. After application of the appropriate amplitude and phase by the RF amplitude and phase controller 312, the flow diagram control may proceed to end step 472 until a next phase and amplitude determination is necessary.

Returning to step 456, when multiple taps or multiple paths in the channel impulse response may need to be considered, the flow diagram control may proceed to step 466. In step 466, the SWG algorithm block 320 may generate the received signal models for cases in which multiple taps or interference sources are considered. In step 468, the SWG algorithm block 320 may utilize the received signal models to determine the SINR for multiple interferers. When the desired signal has i=1, ..., P taps or multiple paths with different delays and the interfering signal has k=1, ..., R taps or multiple paths with different delays, then the maximum SINR solution for the 1-Tx and 2-Rx antenna system in that case may be as follows:

$$SINR_{max} = \frac{\sum_{i=1}^{P} \|h_1 + Ae^{j\theta} h_2\|^2}{\sigma^2(1 + A^2) + \sum_{k=1}^{R} \|h_{I1} + Ae^{j\theta} h_{I2}\|^2}.$$

The $SINR_{max}$ expression may be extended to the single channel MIMO case with or without CL transmit antenna weights.

After determining the SINR in step 468, the SWG algorithm block 320 may determine the amplitude and phase to be provided to the RF amplitude and phase controller 312 in step 470. After application of the appropriate amplitude and phase by the RF amplitude and phase controller 312, the flow diagram control may proceed to end step 472 until a next phase and amplitude determination is necessary.

The operations to maximize the signal strength described for steps 460, 464, and 468 may be based on a search algorithm. In an exemplary embodiment of the invention, a search algorithm may be utilized to search over 360-degrees phase rotation in 45-degree or 90-degree phase factor steps and over a 0-5 amplitude range in 0.25 amplitude values or steps, for example. For a 1-Tx and 2-Rx antenna system, with 90-degree phase factor steps, a phase only search algorithm may calculate 4 SNR or SINR values, for example. For a 2-Tx and 2-Rx antenna system with STTD transmit mode, with 90-degree phase factor steps, a phase only search algorithm may calculate 4 SNR or SINR values. For a 2-Tx and 2-Rx antenna system with the CL1 diversity mode, with 90-degree phase factor steps at both receiver and transmitter, a phase only search algorithm may calculate 4×4=16 SNR or SINR values. For a 2-Tx and 2-Rx antenna system with the CL2 diversity mode, with 90-degree phase factor steps at the receiver and 45-degree phase factor steps and two power scaling weight levels at the transmitter, a phase only search algorithm may calculate 4×8×2=64 SNR or SINR values, for example. The maximum value generated by the algorithm may be the output of the search algorithm.

In another embodiment of the invention, a closed-form mathematical expression may also be utilized to maximize the SNR and/or the SINR. Utilizing an algorithm or closed-form expression that maximizes the SINR or SNR may provide a good compromise between implementation complexity and performance gains. Notwithstanding, the invention is not limited in this regard, and other channel weight algorithms may also be utilized.

Figure 5:
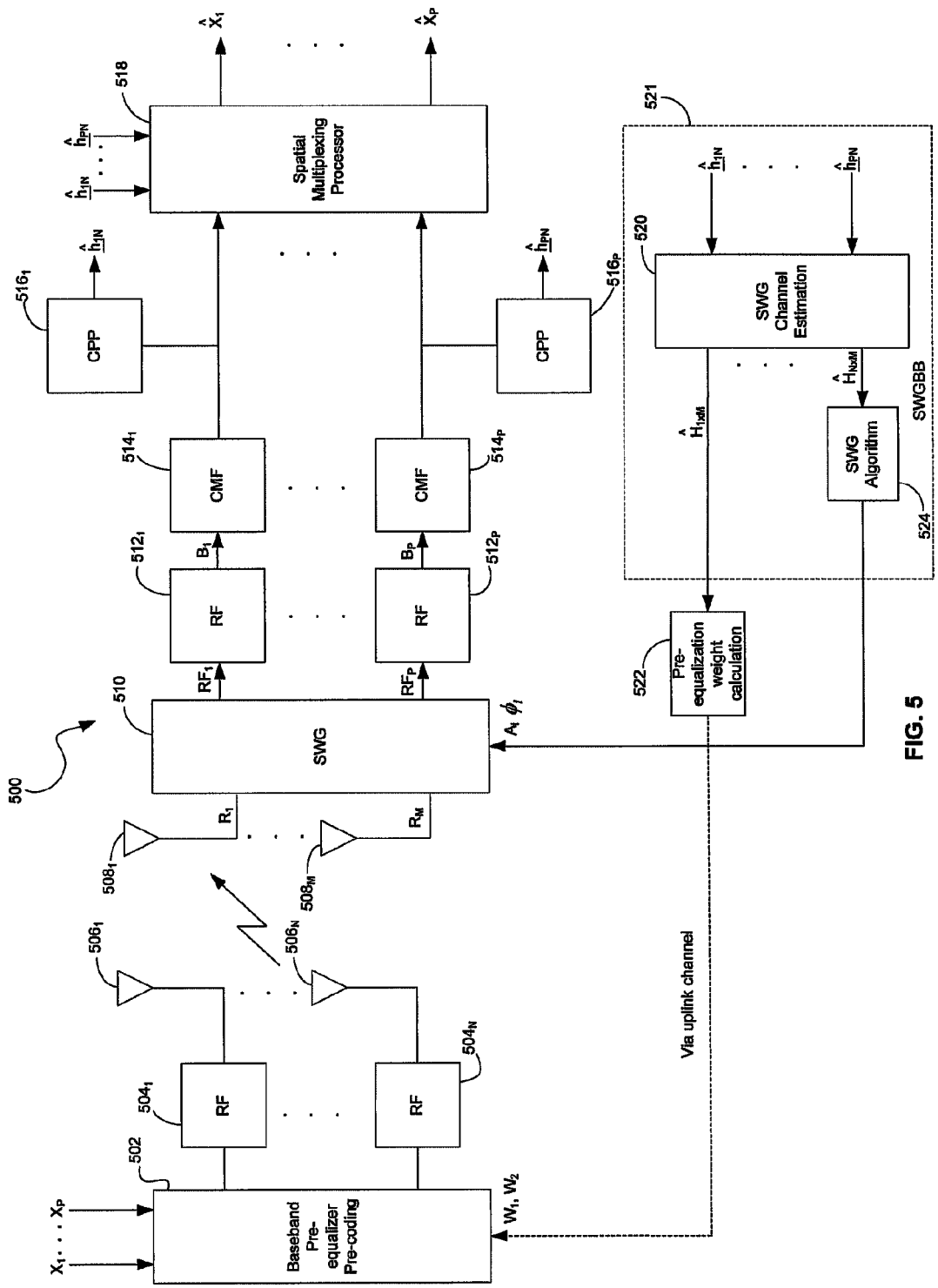
FIG. 5 is a block diagram of exemplary N Tx antenna and M Rx antenna with pre-equalization and spatial multiplexing in a single weight single channel wireless communication system, in accordance with an embodiment of the invention.

FIG. 5 is a block diagram of exemplary N Tx antenna and M Rx antenna with pre-equalization in a single weight single channel spatial multiplexing wireless communication system, in accordance with an embodiment of the invention. Referring to FIG. 5, there is shown a transceiver system 500 that comprises a baseband pre-equalizer and pre-coding block 502, a plurality of RF transmit blocks $504_{1...N}$, a plurality of transmit antennas $506_{1...N}$, a plurality of receive antennas $508_{1...M}$, a single weight generator (SWG) 510, a plurality of RF receive blocks $512_{1...P}$, a plurality of chip matched filters (CMF) $514_{1...P}$, a plurality of cluster path processors CPP $516_{1...P}$, a spatial multiplexing baseband processor (SMBB) 518 and a single weight generator baseband processor (SWGBB) 521. The SWGBB 521 may comprise a single weight generator (SWG) channel estimation block 520, a pre-equalization weight calculation block 522 and a single weight generator (SWG) algorithm block 524.

The baseband pre-equalizer and pre-coding block 502 at the transmitter may contain suitable logic, code and/or circuitry to process a plurality of received weights generated by the pre-equalization weight calculation block 522 to convolve with the transmitted signal. At least a portion of the generated plurality of pre-equalization weights may be fed back to the base station for modifying subsequently transmitted spatially multiplexed communication signals which are transmitted from at least a portion of the plurality of transmit antennas at the base station. The pre-equalization weights may be based on the propagation channel estimates and may be determined by utilizing least-mean squares (LMS), recursive least squares (RLS), or a cost function analysis. The pre-equalization weights may be fed back to a transmitter via an uplink channel. The various embodiments of the invention may provide a good compromise between implementation complexity and performance gains to reduce the effects of, for example, inter-symbol interference (ISI) and/or inter-carrier interference (ICI) in MIMO systems.

The baseband pre-equalizer and pre-coding block 502 may generate a frequency selective signal by utilizing a 2D filtering process that may comprise, for example, matrix multiplication of the calculated weights and the transmitted data sequences and effectively transform the channel from a frequency selective channel to a flat fading channel. In this regard, the baseband pre-equalizer and pre-coding block 502 may be adapted to utilize, for example, an adaptive algorithm to adaptively calculate weights and iteratively search for an optimal weight solution. In accordance with an embodiment of the invention, the baseband pre-equalizer and pre-coding block 502 may be adapted to utilize, for example, a least mean square (LMS) algorithm for the weight calculation. Notwithstanding, the invention is not limited in this regard, and other weight calculation algorithms may be utilized.

The RF transmit blocks $504_{1...N}$ may comprise suitable logic, circuitry, and/or code that may be adapted to process an RF signal. The RF transmit blocks $504_{1...N}$ may perform, for example, filtering, amplification, and analog-to-digital (A/D) conversion operations. The plurality of transmit antennas $506_{1...N}$ may transmit the processed RF signals from the plurality of RF transmit blocks $504_{1...N}$ to a plurality of receive antennas $508_{1...M}$. The single weight generator (SWG) 510 may comprise suitable logic, circuitry, and/or code that may be adapted to determine a plurality of weights to be applied to each of the input signals $R_{1...M}$ to modify the phase and/or amplitude of at least a portion of the signals transmitted from a base station and received by the plurality of receive antennas $508_{1...M}$ and generate a plurality of output signals $RF_{1...P}$. The plurality of RF receive blocks $512_{1...P}$ may comprise suitable logic, circuitry and/or code that may be adapted to amplify and convert the received analog RF signals $RF_{1...P}$ down to baseband. The plurality of RF receive blocks $512_{1...P}$ may each comprise an analog-to-digital (A/D) converter that may be utilized to digitize the received analog baseband signal.

The plurality of chip matched filters (CMF) $514_{1...P}$ may comprise suitable logic, circuitry and/or code that may be adapted to filter the output of the plurality of RF receive blocks $512_{1...P}$ so as to produce in-phase (I) and quadrature (Q) components (I, Q). In this regard, in an embodiment of the invention, the plurality of chip matched filters (CMF) $514_{1...P}$ may comprise a pair of digital filters that are adapted to filter the I and Q components to within the bandwidth of WCDMA baseband (3.84 MHz), for example.

The plurality of cluster pair processors CPP $516_{1...P}$ may generate a plurality of channel estimates $\hat{h}_{1N}$ to $\hat{h}_{PN}$ that may correspond to the plurality of receive antennas $508_{1...M}$. U.S. application Ser. No. 11,173,854 provides a detailed description of signal clusters and is hereby incorporated herein by reference in its entirety. The SWG channel estimation block 520 may process these estimates $\hat{h}_{1N}$ to $\hat{h}_{PN}$ and may generate a matrix $\hat{H}_{1 \times M}$ to $\hat{H}_{N \times M}$ of processed baseband combined channel estimates that may be utilized by the pre-equalization weight calculation block 522 and the single weight generator (SWG) algorithm block 524.

The SMBB 518 may be adapted to receive a plurality of in-phase and quadrature components (I, Q) from a plurality of chip matched filters (CMF) $514_{1...P}$ and a plurality of baseband combined channel estimates $\hat{h}_{1N}$ to $\hat{h}_{PN}$ from a plurality of cluster path processors CPP $516_{1...P}$ to generate a plurality of channel estimates $\hat{X}_1$ to $_P\hat{X}$ of the original input signals $X_1$ to $X_P$. The SMBB 518 may be adapted to separate the different space-time channels utilizing a Bell Labs Layered Space-Time (BLAST) algorithm, for example, by performing sub-stream detection and sub-stream cancellation. The capacity of transmission may be increased almost linearly by utilizing the BLAST algorithm. The pre-equalization technique may improve the performance of the receiver by transforming the frequency selective channel to a flat fading channel.

The pre-equalization weight calculation block 522 may comprise suitable logic, circuitry and/or code that may be adapted to calculate the effective weights to be sent to the baseband pre-equalizer and pre-coding block 502 at the transmitter. The weight calculation may be based on a cost function or a second order statistical technique based on the pre-equalization method used. Certain pre-coding techniques may require less complicated processing on the receiver side. The pre-equalizer weight calculation block 522 may be adapted to determine the pre-equalization parameters based on, for example, a least-mean squares (LMS) algorithm, a recursive least squares (RLS) algorithm, direct matrix inversion, a cost function analysis, or a second order statistical technique.

When utilizing a cost function analysis, for example, coefficients utilized by the pre-equalizer to determine the pre-equalization parameters may be obtained based on the minimization of a cost function, J, of the form J=f(SINR) or J=f(SNR), where f(x) denotes a function of variable x and SINR and SNR are the signal-to-interference-and-noise ratio and signal-to-noise ratio of the received signals, respectively. For example, a cost function $J=(SINR)^{-1}$ may be minimized to obtain pre-equalizer coefficients that may be utilized to determine the pre-equalization parameters. The pre-equalizer may apply and/or modify cost function parameters associated with variables utilized with the cost function. In certain instances, pre-coding techniques may be utilized in order to require less complicated processing of the pre-equalization parameters on the receiver side.

The SWG algorithm block 524 may determine a plurality of phase and amplitude values $A_i$ and $\phi_i$ which may be utilized by SWG 510 to modify the phase and amplitude of a portion of the transmitted signals received by the plurality of receive antennas $508_{1 \ldots M}$ and generate a plurality of output signals $RF_{1 \ldots P}$. The SWG algorithm block 524 may also be adapted to calculate the effective weights $W_1$ and $W_2$ to be transmitted to the baseband pre-equalizer and pre-coding block 502 at the transmitter. The weight calculation may be based on a cost function or a second order statistical technique based on the pre-equalization method used.

Figure 6:
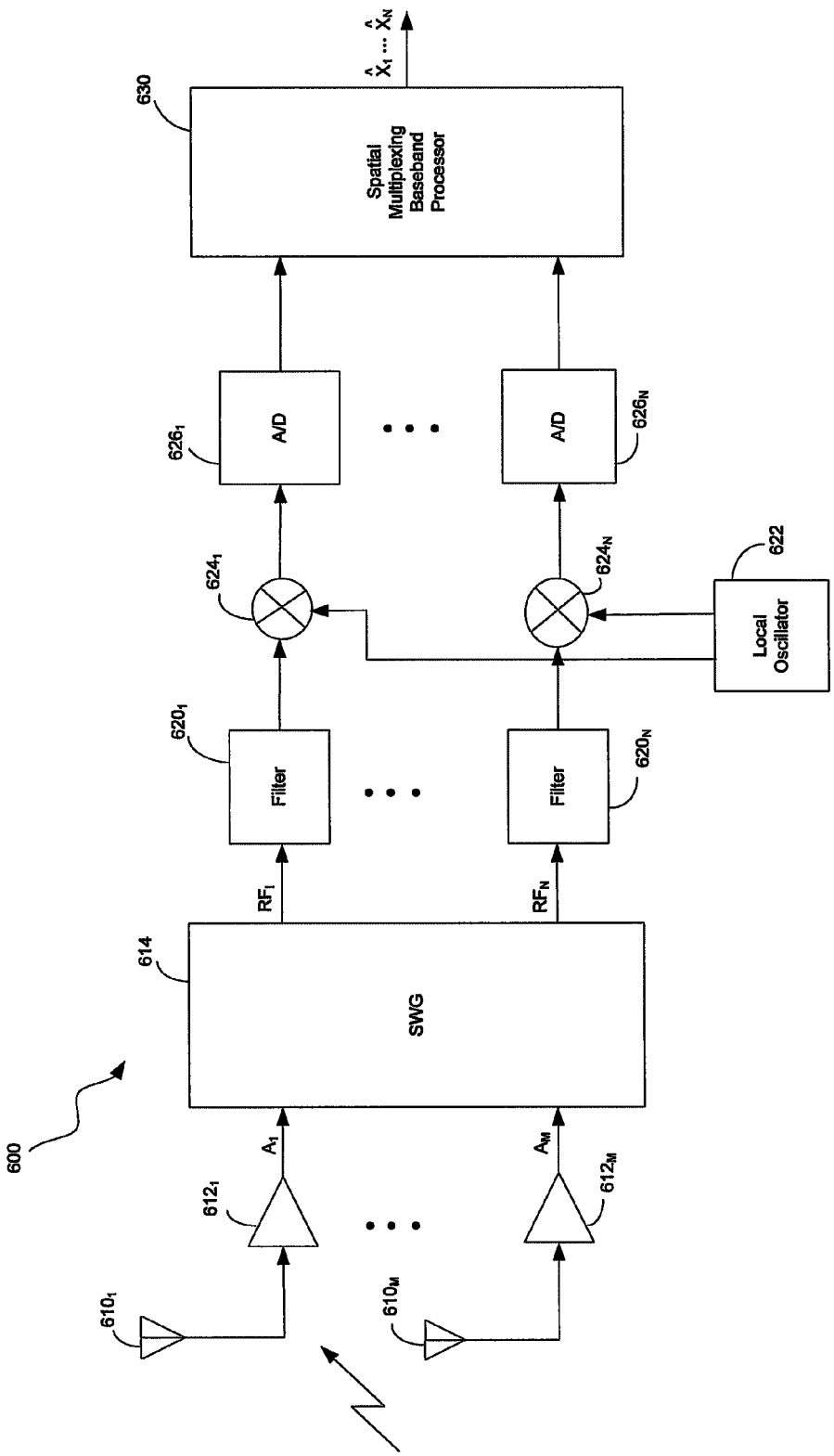
FIG. 6 is a block diagram of an exemplary receiver illustrating spatial multiplexing in a MIMO communication system that may be utilized in connection with an embodiment of the invention.

FIG. 6 is a block diagram of an exemplary receiver illustrating spatial multiplexing in a MIMO communication system that may be utilized in connection with an embodiment of the invention. Referring to FIG. 6, there is shown a receiver 600 that comprises a plurality of receive antennas $610_{1,2,\ldots,M}$, a plurality of amplifiers $612_{1,2,\ldots,M}$, a SWG block 614, a plurality of filters $620_{1,2,\ldots,N}$, a local oscillator 622, a plurality of mixers $624_{1,2,\ldots,N}$, a plurality of analog to digital (ND) converters $626_{1,2,\ldots,N}$ and a spatial multiplexing baseband processor SMBB 630.

The antennas $610_{1,2,\ldots,M}$ may be adapted to receive the transmitted signals. The amplifiers $612_{1,2,\ldots,M}$ may be adapted to amplify the M received input signals. The SWG block 614 may comprise a plurality of amplitude and phase shifters to compensate for the phase difference between various received input signals. Weights may be applied to each of the input signals $A_{1 \ldots M}$ to modify the phase and amplitude of a portion of the transmitted signals received by the plurality of receive antennas $612_{1 \ldots M}$ and generate a plurality of output signals $RF_{1 \ldots N}$. The plurality of filters $620_{1,2,\ldots,N}$ may be adapted to filter frequency components of the RF substreams. The mixers $624_{1,2,\ldots,N}$ may be adapted to downconvert the analog RF substreams to baseband. The local oscillator 622 may be adapted to provide a signal to the mixers $624_{1,2,\ldots,N}$, which is utilized to downconvert the analog RF substreams to baseband. The analog to digital (ND) converters $626_{1,2,\ldots,N}$ may be adapted to convert the analog baseband substreams into their corresponding digital substreams. The spatial multiplexing baseband processor SMBB 630 may be adapted to process the digital baseband substreams and multiplex the plurality of digital signals to generate output signals $\hat{X}_1 \ldots \hat{X}_N$, which may be estimates of the original signals $X_1 \ldots X_N$.

In operation, the MT RF signals transmitted by a plurality of transmitters may be received by a plurality of M receive antennas $610_{1,2,\ldots,M}$ deployed at the receiver 600. Each of the M received signals may be amplified by a respective low noise amplifier $612_{1,2,\ldots,M}$. A plurality of weights may be applied to each of the input signals to modify the phase and amplitude of a portion of the transmitted signals received by the plurality of receive antennas $612_{1 \ldots M}$. A plurality of output signals $RF_{1 \ldots N}$ may be generated, which may be filtered by a plurality of filters $620_{1,2,\ldots,N}$. The resulting N filtered signals may then be downconverted to baseband utilizing a plurality of N mixers $624_{1,2,\ldots,N}$, each of which may be provided with a carrier signal that may be generated by a local oscillator 622. The N baseband signals generated by the mixers $624_{1,2,\ldots,N}$ may then be converted to digital signals by a plurality of analog to digital (ND) converters $626_{1,2,\ldots,N}$. The N digital signals may further be processed by a spatial multiplexing baseband processor SMBB 530 to generate output signals or symbols $\hat{X}_1 \ldots \hat{X}_N$ which may be estimates of the original spatial multiplexing sub-stream signals or symbols $X_1 \ldots X_N$.

Figure 7:
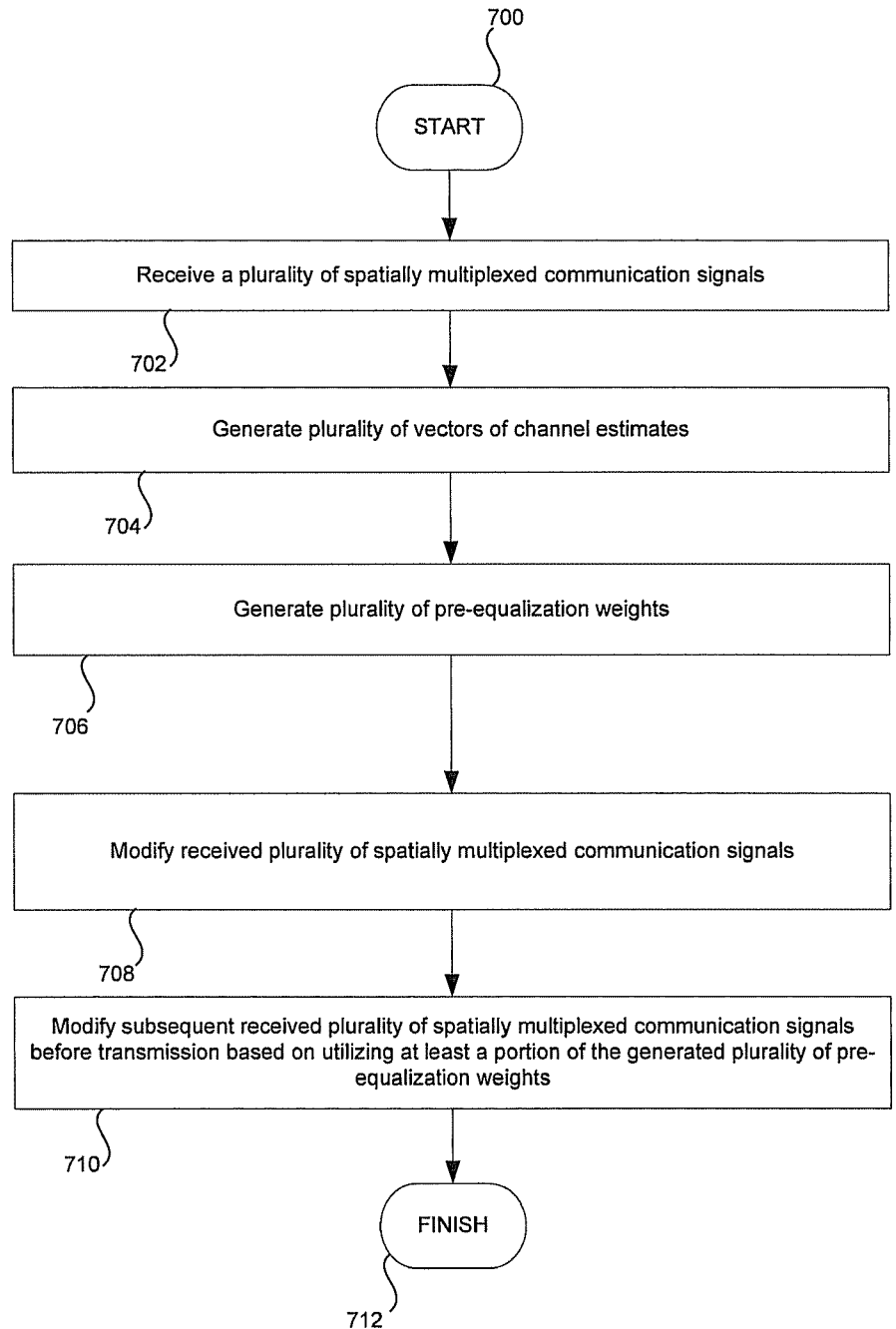
FIG. 7 is a flowchart illustrating exemplary steps that may be utilized for pre-equalization in a spatially multiplexed wireless communication system, in accordance with an embodiment of the invention.

FIG. 7 is a flowchart illustrating exemplary steps that may be utilized for pre-equalization in a spatially multiplexed wireless communication system, in accordance with an embodiment of the invention. Referring to FIG. 7, the exemplary steps may start at step 700. In step 702, a plurality of spatially multiplexed communication signals may be received from a plurality of transmit antennas. In step 704, a plurality of vectors of baseband combined channel estimates may be generated based on phase rotation of the received plurality of spatially multiplexed communication signals. In step 706, a plurality of pre-equalization weights may be generated based on the generated plurality of vectors of baseband combined channel estimates. In step 708, the received plurality of spatially multiplexed communication signals may be modified based on the generated plurality of pre-equalization weights. In step 710, the subsequent received plurality of spatially multiplexed communication signals may be modified before transmission from the plurality of transmit antennas by utilizing at least a portion of the generated plurality of pre-equalization weights. Control then passes to end step 712.

Another embodiment of the invention may provide a machine-readable storage, having stored thereon, a computer program having at least one code section executable by a machine, thereby causing the machine to perform the steps as described above for pre-equalization in a single weight spatial multiplexing multi-input multi-output (MIMO) system.

In another embodiment of the invention, a plurality of receive antennas $508_{1 \ldots M}$ (FIG. 5) may be adapted to receive a plurality of spatially multiplexed communication signals from a plurality of transmit antennas $506_{1 \ldots N}$ at a base station. A channel estimator, for example, the SWG channel estimation block 520 may generate a plurality of vectors of baseband combined channel estimates based on phase rotation of the received plurality of spatially multiplexed communication signals. For example, the channel estimator 122 may comprise suitable logic, circuitry, and/or code that may be adapted to process the received estimates $\hat{h}_1$ to $\hat{h}_P$ from the SMBB processor 126 and may generate a $\bar{\text{matrix}} \bar{H}$ of processed estimated channels that may be utilized by the single weight generator (SWG) algorithm block 124.

At least one processor may generate a plurality of pre-equalization weights $W_1$ and $W_2$ based on the generated plurality of vectors of baseband combined channel estimates $\hat{H}_{N \times M}$. At least one of the processors may be adapted to modify the received plurality of spatially multiplexed communication signals based on the generated plurality of pre-equalization weights $W_1$ and $W_2$. At least one of the processors may be adapted to feed back at least a portion of the generated plurality of pre-equalization weights to the base station for modifying subsequently transmitted spatially multiplexed communication signals which are transmitted from at least a portion of the plurality of transmit antennas at the base station.

In another embodiment of the invention, at least one of the processors may generate the pre-equalization parameters based on least mean squares (LMS) algorithm, recursive least squares (RLS) algorithm, direct matrix inversion, and/or a cost function. In this regard, the parameters of the cost function may be modified in accordance with the application. At least one of the processors may be adapted to generate the pre-equalization parameters periodically or continuously. The pre-equalization weights $W_1$ and $W_2$ may be fed back to a transmitter via an uplink channel. At least one of the processors may be adapted to spatially demultiplex the received plurality of spatially multiplexed communication signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, comprising:
   generating a plurality of vectors of baseband combined channel estimates based on phase rotation of a received plurality of spatially multiplexed communication signals, said phase rotation being determined based on orthogonalization of channels associated with said received plurality of spatially multiplexed communication signals;
   generating a plurality of pre-equalization weights based on said generated plurality of vectors of baseband combined channel estimates; and
   feeding back a portion of said generated plurality of pre-equalization weights to a base station for modifying subsequently transmitted spatially multiplexed communication signals,
   wherein at least one step of said method is performed by at least one hardware device.

2. The method according to claim 1, further comprising:
   receiving said plurality of spatially multiplexed communication signals from a plurality of transmit antennas at said base station.

3. The method according to claim 2, further comprising:
   modifying subsequently received spatially multiplexed communication signals based on a generated plurality of weights.

4. The method according to claim 2, further comprising:
   spatially demultiplexing said received plurality of spatially multiplexed communication signals.

5. The method according to claim 1, further comprising:
   generating said plurality of pre-equalization weights based on one or more of: a least mean squares (LMS) algorithm, a recursive least squares (RLS) algorithm, a direct matrix inversion, and a second order statistical technique.

6. The method according to claim 1, wherein the step of generating a plurality of pre-equalization weights comprises:
   generating said plurality of pre-equalization weights based on a cost function.

7. The method according to claim 6, further comprising:
   modifying at least one of a plurality of parameters in said cost function.

8. The method according to claim 1, wherein the step of generating a plurality of pre-equalization weights comprises:
   generating said plurality of pre-equalization weights periodically or continuously.

9. The method according to claim 1, wherein the step of feeding back comprises:
   feeding back said portion via an uplink channel.

10. A method for processing signals in a communication system, comprising:
    generating a plurality of vectors of baseband combined channel estimates based on phase rotation of a received plurality of spatially multiplexed communication signals, said phase rotation being determined based on orthogonalization of channels associated with said received plurality of spatially multiplexed communication signals;
    generating a plurality of pre-equalization weights and a plurality of phase and amplitude values based on said generated plurality of vectors of baseband combined channel estimates;
    feeding back a portion of said generated plurality of pre-equalization weights to a base station for modifying subsequently transmitted spatially multiplexed communication signals; and
    modifying a phase or an amplitude of subsequently received spatially multiplexed communication signals based on said generated plurality of phase and amplitude values,
    wherein at least one step of said method is performed by at least one hardware device.

11. A system for processing signals in a communication system, comprising:
one or more circuits for use in a receiver, said one or more circuits being configured to:
generate a plurality of vectors of baseband combined channel estimates based on phase rotation of a received plurality of spatially multiplexed communication signals, said phase rotation being determined based on orthogonalization of channels associated with said received plurality of spatially multiplexed communication signals;
generate a plurality of pre-equalization weights based on said generated plurality of vectors of baseband combined channel estimates; and
feed back a portion of said generated plurality of pre-equalization weights to a base station for modifying subsequently transmitted spatially multiplexed communication signals.

12. The system according to claim 11, wherein said one or more circuits are further configured to receive said plurality of spatially multiplexed communication signals from a plurality of transmit antennas at said base station.

13. The system according to claim 12, wherein said one or more circuits are further configured to modify subsequently received spatially multiplexed communication signals based on a generated plurality of weights.

14. The system according to claim 12, wherein said one or more circuits are further configured to spatially demultiplex said received plurality of spatially multiplexed communication signals.

15. The system according to claim 11, wherein said one or more circuits are further configured to generate said plurality of pre equalization weights based on one or more of: a least mean squares (LMS) algorithm, a recursive least squares (RLS) algorithm, a direct matrix inversion, and a second order statistical technique.

16. The system according to claim 11, wherein said one or more circuits are further configured to generate said plurality of pre-equalization weights based on a cost function.

17. The system according to claim 16, wherein said one or more circuits are further configured to modify at least one of a plurality of parameters in said cost function.

18. The system according to claim 11, wherein said one or more circuits are further configured to generate said plurality of pre-equalization weights periodically or continuously.

19. The system according to claim 11, wherein said feeding back occurs via an uplink channel.

20. The system according to claim 11, wherein said one or more circuits are further configured to modify a phase or an amplitude of subsequently received spatially multiplexed communication signals based on a generated plurality of phase and amplitude values, wherein said generated plurality of phase and amplitude values are generated based on said generated plurality of vectors of baseband combined channel estimates.

* * * * *

UNITED STATES PATENT AND TRADEMARK OFFICE
CERTIFICATE OF CORRECTION

PATENT NO. : 8,422,606 B2
APPLICATION NO. : 13/327011
DATED : April 16, 2013
INVENTOR(S) : Kent et al.

Page 1 of 1

It is certified that error appears in the above-identified patent and that said Letters Patent is hereby corrected as shown below:

In the Claims:

Column 22, Line 3, replace "pre equalization" with --pre-equalization--

Signed and Sealed this
Sixteenth Day of July, 2013

Teresa Stanek Rea
*Acting Director of the United States Patent and Trademark Office*